US009318739B2

(12) United States Patent
Toya et al.

(10) Patent No.: US 9,318,739 B2
(45) Date of Patent: *Apr. 19, 2016

(54) NICKEL MANGANESE COMPOSITE HYDROXIDE PARTICLES AND MANUFACTURING METHOD THEREOF, CATHODE ACTIVE MATERIAL FOR A NON-AQUEOUS ELECTROLYTE SECONDARY BATTERY AND MANUFACTURING METHOD THEREOF, AND A NON-AQUEOUS ELECTROLYTE SECONDARY BATTERY

(71) Applicant: SUMITOMO METAL MINING CO., LTD., Tokyo (JP)

(72) Inventors: Hiroyuki Toya, Ehime (JP); Kazuomi Ryoshi, Ehime (JP); Toshiyuki Osako, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 13/925,971

(22) Filed: Jun. 25, 2013

(65) Prior Publication Data
US 2013/0288129 A1 Oct. 31, 2013

Related U.S. Application Data

(62) Division of application No. 13/520,915, filed as application No. PCT/JP2011/069350 on Aug. 26, 2011.

(30) Foreign Application Priority Data

Jun. 7, 2011 (JP) .................................. 2011-127763

(51) Int. Cl.
*H01M 4/88* (2006.01)
*H01M 4/485* (2010.01)
(Continued)

(52) U.S. Cl.
CPC ............... *H01M 4/485* (2013.01); *C01G 53/00* (2013.01); *C01G 53/006* (2013.01); *C01G 53/50* (2013.01);
(Continued)

(58) Field of Classification Search
CPC ...... H01M 4/131; H01M 4/505; C01G 53/00; C01G 53/006
USPC ..................... 252/182.1; 429/206, 223, 594.3
See application file for complete search history.

(56) References Cited

U.S. PATENT DOCUMENTS 6,255,020 B1 7/2001 Yamashita et al.

FOREIGN PATENT DOCUMENTS

JP 03252318 A 11/1991
JP 2003086182 A 3/2003
(Continued)

OTHER PUBLICATIONS

United States Office Action dated Aug. 6, 2014, from corresponding U.S. Appl. No. 13/520,915.
(Continued)

Primary Examiner — Khanh Tuan Nguyen
(74) Attorney, Agent, or Firm — Katten Muchin Rosenman LLP

(57) ABSTRACT

To obtain a non-aqueous electrolyte secondary battery having high capacity, high output and good cyclability, nickel manganese composite hydroxide particles are a precursor for a cathode active material having lithium nickel manganese composite oxide with a hollow structure and a small and uniform particle size.

An aqueous solution for nucleation includes a metallic compounds that contains nickel and a metallic compound that contains manganese, but does not include a complex ion formation agent that forms complex ions with nickel, manganese and cobalt. After nucleation is performed, an aqueous solution for particle growth is controlled so that the temperature of the solution is 60° C. or greater, and so that the pH value that is measured at a standard solution temperature of 25° C. is 9.5 to 11.5, and is less than the pH value in the nucleation step.

10 Claims, 10 Drawing Sheets

(51) Int. Cl.
*C01G 53/00* (2006.01)
*H01M 10/052* (2010.01)
*H01M 4/131* (2010.01)
*H01M 4/36* (2006.01)
*H01M 4/48* (2010.01)
*H01M 4/1391* (2010.01)
*H01M 10/04* (2006.01)
*H01M 4/02* (2006.01)

(52) U.S. Cl.
CPC .............. *H01M 4/131* (2013.01); *H01M 4/362* (2013.01); *H01M 4/483* (2013.01); *H01M 10/052* (2013.01); *C01P 2002/52* (2013.01); *C01P 2004/03* (2013.01); *C01P 2004/32* (2013.01); *C01P 2004/50* (2013.01); *C01P 2004/51* (2013.01); *C01P 2004/61* (2013.01); *C01P 2004/88* (2013.01); *H01M 4/1391* (2013.01); *H01M 10/0427* (2013.01); *H01M 2004/028* (2013.01); *Y02E 60/122* (2013.01); *Y02P 70/54* (2015.11)

(56) References Cited

FOREIGN PATENT DOCUMENTS

| | | |
|---|---|---|
| JP | 2004193115 A | 7/2004 |
| JP | 2004210560 A | 7/2004 |
| JP | 2004253174 A | 9/2004 |
| JP | 2004349109 A | 12/2004 |
| JP | 200575691 | 3/2005 |
| JP | 2006114408 | 4/2006 |
| JP | 2006228604 A | 8/2006 |
| JP | 2008147068 A | 6/2008 |
| JP | 2008235157 A | 10/2008 |
| JP | 2008251191 A | 10/2008 |
| JP | 2009117241 | 5/2009 |
| JP | 2009117369 A | 5/2009 |
| JP | 2011116582 A | 6/2011 |
| WO | 2011067935 | 6/2011 |

OTHER PUBLICATIONS

United States Office Action dated Feb. 25, 2014, from corresponding U.S. Appl. No. 13/520,915.
Ohzuku et al., "Layered Lithium Isertion Material of LiNi1/2Mn1/2O2: A Possible Alternative to LiCoO2 for Advanced Lithium-Ion Batteries", Chemistry Letters, vol. 30 (2001), No. 8, p. 744.
International Search Report dated Oct. 4, 2011 from the corresponding International Application No. PCT/JP2011/069350.
United States Office Action dated Feb. 26, 2013, from corresponding U.S. Appl. No. 13/520,915.
United States Office Action dated Apr. 8, 2013, from corresponding U.S. Appl. No. 13/520,915.
United States Office Action dated Aug. 21, 2013, from corresponding U.S. Appl. No. 13/520,915.
Brief for Appellants dated Apr. 6, 2015, which was filed in the corresponding U.S. Appl. No. 13/520,915.
Korean Office Action dated Nov. 9, 2012 for the Corresponding Korean Patent Application No. 10-2012-7016972.
Synthetic optimization of Li[Ni$^{1/3}$ Co$^{1/3}$ / Mn$^{1/3}$ ]O2 via co-precipitation; Electrochimica Acta 50 (2004) 939-948; Department of Chemical Engineering. Center for Information and Communication Materials, Hanyang University Seimgdoung-Gu, Seoul 133-191. Republic of Korea; Department of Chemical Engineering; Faculty of Engineering; Iwate University, 4-3-5 Ueda, Morioka, Iwate 020-8551, Japan; Received Jan. 15, 2004; received in revised form May 20, 2004; accepted Jul. 17, 2004; Available online Sep. 11, 2004.

NICKEL MANGANESE COMPOSITE HYDROXIDE PARTICLES AND MANUFACTURING METHOD THEREOF, CATHODE ACTIVE MATERIAL FOR A NON-AQUEOUS ELECTROLYTE SECONDARY BATTERY AND MANUFACTURING METHOD THEREOF, AND A NON-AQUEOUS ELECTROLYTE SECONDARY BATTERY

CROSS-REFERENCE TO RELATED APPLICATIONS

This application is a divisional application of and claims priority to U.S. Ser. No. 13/520,915 filed Oct. 4, 2012, which is pending and which is hereby incorporated by reference in its entirety for all purposes. U.S. Ser. No. 13/520,915 is a national phase application of and claims priority to international application PCT/JP2011/069350 filed Aug. 26, 2011, which is hereby incorporated by reference in its entirety for all purposes. PCT/JP2011/069350 claims priority to Japanese application 2011-127763 filed Jun. 7, 2011.

BACKGROUND OF THE INVENTION

1. Field of the Invention

The present invention relates to nickel manganese composite hydroxide particles, which are a precursor to cathode active material for a non-aqueous electrolyte secondary battery, and the manufacturing method thereof, cathode active material for a non-aqueous electrolyte secondary battery, which uses the nickel manganese composite hydroxide particles as a raw material, and the manufacturing method thereof, and a non-aqueous electrolyte secondary battery that uses the cathode active material for a non-aqueous electrolyte secondary battery as the cathode material.

2. Description of the Related Art

In recent years, as portable electronic devices such as mobile telephones and notebook personal computers become widespread, there is a large need for development of compact and lightweight non-aqueous electrolyte secondary batteries that have high energy density. Moreover, there is also a strong need for development of a high-output secondary battery as a motor drive battery, and particularly, as a battery for the power source of transport equipment.

As a secondary battery that satisfies this kind of need is a lithium-ion rechargeable battery. A lithium-ion rechargeable battery comprises an anode, a cathode and an electrolyte, and a material in which lithium can be desorbed and inserted is used as the active material for the anode and cathode.

Currently, much research and development is being performed related to lithium-ion batteries, and of that, research of lithium-ion batteries that use layered or spinel type lithium metal composite oxide as the cathode material has been advancing as high-energy density batteries that are capable of 4V class high voltage.

Currently, as the cathode material of that kind of lithium-ion secondary battery, lithium composite oxides such as lithium cobalt composite oxide ($LiCoO_2$) having a relatively simple composition, lithium nickel composite ($LiNiO_2$), which uses nickel that is less expensive than cobalt, lithium nickel manganese cobalt composite oxide ($LiNi_{1/3}CO_{1/3}Mn_{1/3}O_2$), lithium manganese composite oxide ($LiMn_2O_4$) that uses manganese, and lithium nickel manganese composite oxide ($LiNi_{0.5}Mn_{0.5}O_2$) have been proposed.

Among these cathode active materials, lithium nickel manganese composite oxide (($LiNi_{0.5}Mn_{0.5}O_2$), which is high capacity, has excellent thermal stability and does not use cobalt of which there are few reserves, has gained much attention in recent years. Lithium nickel manganese composite oxide (($LiNi_{0.5}Mn_{0.5}O_2$) is layered in the same way as lithium cobalt composite oxides and lithium nickel composite oxides, and nickel and manganese are included in transitional metal sites at basically a compositional ratio of 1:1 (Ohzuku et al., "Layered Lithium Insertion Material of $LiNi_{1/2}Mn_{1/2}O_2$: A Possible Alternative to $LiCoO_2$ for Advanced Lithium-Ion Batteries", Chemistry Letters, Vol. 30 (2001), No. 8, p. 744).

Incidentally, as a condition for a lithium ion secondary battery to obtain good performance characteristics such as high output, low resistance, high cyclability, and high capacity, cathode material comprising particles having a uniform and suitable particle size is required.

This is because, when a cathode material having a large particle size and low specific surface area is used, the reactive area with the electrolyte cannot be sufficiently maintained, so the reaction resistance rises, and it is not possible to obtain a battery having high output. Moreover, when a cathode material having a wide particle size distribution is used, the voltage applied to the particles in the electrode become uneven, and when the battery is repeatedly recharged, small particles selectively deteriorate, and the capacity decreases.

In aiming for high output of a lithium-ion secondary battery, shortening the distance between the cathode and anode is effective, so preferably the cathode plate is made to be thin, and from this aspect as well, using cathode material having a small particle size is useful.

Therefore, in order to improve the performance of the cathode material, it is important that lithium nickel manganese composite oxide, which is a cathode active material, be manufactured so that the particle size is small and uniform.

Lithium nickel manganese composite oxide is normally manufactured from composite hydroxide, so in order to make the lithium nickel manganese composite oxide particles small with a uniform size, it is necessary to use a composite hydroxide as the raw material that has small particles with a uniform particle size.

In other words, in order to improve the performance of the cathode material and manufacture a high-performance lithium-ion secondary battery as a final product, it is necessary to use a composite hydroxide that comprises particles having a small particle size and narrow particle distribution as the composite hydroxide that will become the raw material of the lithium nickel manganese composite oxide used in forming the cathode material.

As a nickel manganese composite hydroxide that is used as the raw material of a lithium nickel manganese composite oxide, proposed are manganese nickel composite hydroxide particles as disclosed in JP2004-210560(A) which are composite hydroxide particles having a manganese to nickel ratio of 1:1, with an average particle size of 5 to 15 μm, tap density of 0.6 to 1.4 g/ml, bulk density of 0.4 to 1.0 g/ml, specific surface area of 20 to 55 $m^2/g$, amount of sulfate radical contained being 25 to 45 weight %, and in X-ray diffraction, a ratio ($I_0/I_1$) of the maximum strength ($I_0$) of the peak in the range $15 \leq 2\theta \leq 25$ and the maximum strength ($I_1$) of the peak in the range $30 \leq 2\theta \leq 40$ of 1 to 6. The secondary particle surface and internal structure is formed in a netlike structure with fold-like walls of primary particles, with the space surrounded by the fold-like walls being relatively large.

Furthermore, as the manufacturing method, a method is disclosed in which, while keeping the amount of oxidation of manganese ions within a set range, a mixed aqueous solution of manganese salt and nickel salt having a atomic ratio of manganese and nickel of 1:1 is mixed and reacted with an alkaline solution in an aqueous solution having a pH of 9 to 13 with the existence of a complexing agent to cause coprecipitation of particles.

However, in the case of the lithium manganese nickel composite oxide and manufacturing method disclosed in JP2004-210560(A), when investigating the structure of the particles, it can be clearly seen in the disclosed electron micrograph that coarse particles and fine particles are mixed together in the obtained particles, and making the particle size uniform has not been considered.

On the other hand, in regards to the particle size distribution of lithium composite oxide particles, a lithium composite oxide has been disclosed in JP2008-147068(A) such that in the particle size distribution curve, the particles have a particle size distribution with an average particle size D50, which means the particle size of a cumulative frequency of 50%, of 3 to 15 µm, a minimum particle size of 0.5 µm or greater, and a maximum particle size of 50 µm or less, and where in the relationship between average particle size D10 at a cumulative frequency of 10% and D90 at a cumulative frequency of 90%, the ratio D10/D50 is 0.60 to 0.90, and the ratio D10/D90 is 0.30 to 0.70. It has also been disclosed that this lithium composite oxide has high repletion, excellent discharge capacity characteristic and high output characteristic, and does not easily deteriorate even under conditions of a large discharge load, so by using this lithium composite oxide, a non-aqueous electrolyte lithium ion secondary battery having excellent output characteristics and little deterioration of cyclability can be obtained.

However, the lithium composite oxide disclosed in JP2008-147068(A) includes fine particles and coarse particles as a minimum particle size 0.5 µm or greater and a maximum particle size of 50 µm or less with respect to an average particle size of 3 to 15 µm. The particle size distribution that is regulated by D10/D50 and D10/D90 is not a narrow particle size distribution range. In other words, the lithium composite oxide of JP2008-147068(A) does not have sufficiently high uniformity of particle size, and when that lithium composite oxide is used, an improvement in performance of the cathode material cannot be expected, and it is difficult to obtain a non-aqueous electrolyte lithium-ion secondary battery having sufficient performance.

Moreover, a method for manufacturing a composite hydroxide that will become the raw material for a composite oxide aimed at improving the particle size distribution has been disclosed. In JP2003-86182(A), in a method for manufacturing a cathode active material for a non-aqueous electrolyte battery, a method for obtaining a hydroxide or oxide as a precursor is disclosed in which an aqueous solution containing two or more kinds of transition metal salts, or an aqueous solution containing two or more different transition metal salts and an alkaline solution are simultaneously put into a reaction vessel, and co-precipitation is performed while causing the solution to coexisting with a reducing agent or by passing an inert gas though the solution.

However, the technology disclosed in JP2003-86182(A) is for recovery while classifying the generated crystals, so in order to obtain a material having uniform particle size, strictly managing the manufacturing conditions is considered to be necessary, so production on an industrial scale is difficult. Moreover, even though it is possible to obtain crystal grain having a large grain size, obtaining small particles is difficult.

Furthermore, in order to make a battery with high output, increasing the size of the reactive area without changing the particle size is effective. In other words, by making particles that are porous, or that have a hollow particle structure, it is possible to increase the surface area that contributes to the battery reaction, and it is possible to reduce the reaction resistance.

For example, in JP2004-253174(A), cathode active material for a non-aqueous electrolyte secondary battery having at least a layered structure of a lithium transition metal composite oxide is disclosed wherein the lithium transition metal composite oxide comprises hollow particles having a shell section on the outside and a hollow section on the inside of the outer shell section. Also disclosed is that this cathode active material for a non-aqueous electrolyte secondary battery has excellent battery characteristics such as cycle characteristics, output characteristics, thermal stability and the like, and can suitably be used for a lithium-ion secondary battery.

However, cathode active materials disclosed in JP2004-253174(A) is expected to have a greater specific surface area than solid particles because the cathode active material has hollow particles, but JP2004-253174(A) does not mention the particle size thereof. Therefore, improvement in reactivity with the electrolyte due to an increase in specific surface area can be expected, however, the effect on the migration distance of the lithium ions due to making the particles smaller is not clear, and a sufficient improvement in output characteristics cannot be expected. Furthermore, in regards to the particle size distribution, the particle size distribution is considered to be the same as in conventional cathode active material, so selective deterioration of minute particles due to uneven voltage that is applied inside the electrodes occurs, and there is a strong possibility that there will be a drop in battery capacity.

As described above, currently neither a lithium composite oxide that can sufficiently improve the performance of a lithium-ion secondary battery, nor a composite hydroxide that will become the raw material for that composite oxide have been developed. Moreover, after investigating various methods for manufacturing composite hydroxides, currently a method that is capable on an industrial scale to manufacture a composite hydroxide that can become the raw material for a composite oxide capable of improving the performance of a lithium-ion secondary battery has not been developed. In other words, a cathode active material having particles with a small and uniform particle size, and that have a large reactive area, for example having a hollow structure, having not been developed, and a method capable of industrially manufacturing that kind of cathode active material is desired.

RELATED LITERATURE

Patent Literature

[Patent Literature 1] JP2004-210560(A)
[Patent Literature 2] JP2008-147068(A)
[Patent Literature 3] JP2003-86182(A)
[Patent Literature 4] JP2004-253174(A)

Non-Patent Literature

[Non-patent Literature 1] Ohzuku et al., "Layered Lithium Insertion Material of $LiNi_{1/2}Mn_{1/2}O_2$: A Possible Alternative to $LiCoO_2$ for Advanced Lithium-Ion Batteries", Chemistry Letters, Vol. 30 (2001), No. 8, p. 744

SUMMARY OF THE INVENTION

Problem to be Solved by the Invention

In consideration of the problems above, an object of the present invention is to provide nickel manganese composite hydroxide particles that, when used as a raw material, a lithium nickel manganese composite oxide is obtained that has small particles with a uniform particle size, and that due to a hollow particle structure have a high specific surface area.

Moreover, another object of the present invention is to provide a cathode active material for a non-aqueous electrolyte secondary battery that can reduce the value of the cathode resistance that is measured when used in a battery, and to provide a non-aqueous electrolyte secondary battery that uses that cathode active material and that has high capacity, good cyclability and high output.

Furthermore, another object of the present invention is to provide a method for industrially manufacturing the nickel manganese composite hydroxide particles and cathode active material.

Means for Solving the Problems

The inventors diligently studied the use of lithium nickel manganese composite oxide, which is capable of displaying excellent battery characteristics, as the cathode material for a lithium ion secondary battery, and as a result, obtained was a technical knowledge that by controlling the particle size distribution of nickel manganese composite hydroxide, which is the raw material, and by giving nickel manganese composite hydroxide a structure provided with a center section comprising fine primary particles and an outer shell section on the outside of the center section comprising of primary particles that are larger than the primary particles of the center section, it is possible to obtain lithium nickel manganese composite oxide having hollow structure and comprising small particles with a highly uniform particle size. Also obtained was a technical knowledge that by dividing crystallization into a nucleation step and a particle growth step by controlling the pH and using an aqueous solution in each step that does not substantially include a complex ion formation agent that forms complex ions with nickel, manganese and cobalt, the above nickel manganese composite hydroxide can be obtained. The present invention was achieved based on the above technical knowledge obtained by the inventors.

In other words, a manufacturing method of nickel manganese composite hydroxide particles of the present invention is a method for manufacturing nickel manganese composite hydroxide particles by a crystallization reaction such that the nickel manganese composite hydroxide particles can be expressed by the general formula $Ni_xMn_yCo_zM_t(OH)_{2+a}$ (where $x+y+z+t=1$, $0.3 \leq x \leq 0.7$, $0.1 \leq y \leq 0.55$, $0 \leq z \leq 0.4$, $0 \leq t \leq 0.1$, $0 \leq a \leq 0.5$, and M is one or more added element that is selected from among Mg, Ca, Al, Ti, V, Cr, Zr, Nb, Mo and W), the manufacturing method comprising:

a nucleation step of controlling an aqueous solution for nucleation, which includes at least a metallic compound that contains nickel and a metallic compound that contains manganese, and does not include a complex ion formation agent that forms complex ions with nickel, manganese and cobalt, so that the temperature of the solution is 60° C. or greater, and so that the pH value that is measured at a standard solution temperature of 25° C. is 11.5 to 13.5, and generating nuclei as center sections comprising fine primary particles; and a particle growth step of controlling an aqueous solution for particle growth, which includes the nuclei that were formed in the nucleation step and does not substantially include a complex ion formation agent that forms complex ions with nickel, manganese and cobalt, so that the temperature of the solution is 60° C. or greater, and so that the pH value that is measured at a standard solution temperature of 25° C. is 9.5 to 11.5, and is less than the pH value in the nucleation step, and growing an outer shell section comprising primary particles having a plate shape or needle shape that is larger than the fine primary particles on an outer surface of the nuclei.

In the nucleation step and particle growth step, preferably the oxygen concentration inside the reaction tank is controlled to be 10% by volume or less.

The aqueous solution resulting from adjusting the pH value of the aqueous solution for nucleation after the nucleation step has finished can be used as the aqueous solution for particle growth. Alternatively, it is possible to use a solution that is obtained by adding an aqueous solution, which contains the nuclei formed in the nucleation step, to a component adjustment aqueous solution, which is separate from the aqueous solution for nucleation in which the nuclei were formed, does not substantially include a complex ion formation agent that forms complex ions with nickel, manganese and cobalt, and is controlled so that the solution temperature is 60° C. or greater, and so that the pH value that is measured at a standard solution temperature of 25° C. is 9.5 to 11.5 and is lower than the pH value in the nucleation step, as the aqueous solution for particle growth.

Preferably, the particle growth step starts after part of the liquid component of the aqueous solution for particle growth has been removed.

Furthermore, in the nucleation step and particle growth step when manufacturing nickel manganese composite hydroxide that includes one or more kinds of added elements, it is possible for the aqueous solution for nucleation or the aqueous solution for particle growth to be an aqueous solution that is obtained by adding an aqueous solution in which a salt containing the one or more added elements is added to a mixed solution that includes a nickel containing metal compound and a manganese containing metal compound, and that does not substantially include a complex ion formation agent that forms complex ions with nickel, manganese and cobalt.

Alternatively, the nickel composite hydroxide that was obtained in the particle growth step can be covered with a compound containing the one or more added elements. As this covering method, there is a method wherein the one or more added elements are caused to be deposited onto the surface of nickel manganese composite hydroxide by adding an aqueous solution containing the one or more added elements to a solution in which nickel manganese composite hydroxide is suspended, while controlling the pH at a specified value; there is a method wherein a slurry, in which nickel manganese composite hydroxide and a salt containing the one or more added elements are suspended, is sprayed and dried; or there is a method wherein nickel manganese composite hydroxide and a salt containing the one or more added elements are mixed in a solid phase method. Particularly, when a complex ion formation agent other than a complex ion formation agent that forms complex ions with nickel, manganese and cobalt forms complex ions between it and a pH adjustment agent for controlling the pH value of each reaction solution, covering with the added elements is necessary.

The nickel manganese composite hydroxide particles of the present invention are nickel manganese composite hydroxide particles that are expressed by the general formula $Ni_xMn_yCo_zM_t(OH)_{2+a}$ (where $x+y+z+t=1$, $0.3 \leq x \leq 0.7$, $0.1 \leq y \leq 0.55$, $0 \leq z \leq 0.4$, $0 \leq t \leq 0.1$, $0 \leq a \leq 0.5$, and M is one or more added element that is selected from among Mg, Ca, Al, Ti, V, Cr, Zr, Nb, Mo and W), and that are spherical shaped secondary particles that are formed by a plurality of aggregate primary particles, wherein the secondary particles have an average particle size of 3 to 7 μm, a value [(d90−d10)/average particle size], which is an index indicating the extent of the particle size distribution, of 0.55 or less, the particles having a center section comprising fine primary particles, and an outer shell section on the outside of the center section comprising plate shaped or needle shaped primary particles that are larger than the fine primary particles, with the thickness of the outer shell section being 0.3 to 3 μm.

Preferably, the fine primary particles have an average particle size of 0.01 to 0.3 μm, and the plate shaped or needle shaped primary particles that are larger than the fine primary particles have an average particle size of 0.3 to 3 μm, and preferably, the ratio of the thickness of the outer shell section with respect to the particle size of the secondary particles is 10 to 45%.

Moreover, preferably, the one or more added elements are uniformly distributed inside the secondary particles and/or uniformly cover the surface of the secondary particles.

Also, preferably, the nickel manganese composite hydroxide particles of the present invention are generated by the manufacturing method for composite hydroxide particles of the present invention.

The manufacturing method for manufacturing cathode active material of the present invention is a manufacturing method for manufacturing cathode active material for a non-aqueous electrolyte secondary battery comprising lithium nickel manganese composite oxide having layered hexagonal crystal structure and expressed by the general formula: $Li_{1+u}Ni_xMn_yCo_zM_tO_2$ (where $-0.05 \leq u \leq 0.50$, $x+y+z+t=1$, $0.3 \leq x \leq 0.7$, $0.1 \leq y \leq 0.55$, $0 \leq z \leq 0.4$, $0 \leq t \leq 0.1$, M is an added element selected from one or more elements from among Mg, Ca, Al, Ti, V, Cr, Zr, Nb, Mo and W), the manufacturing method comprising:

a mixing step that mixes a lithium compound into the nickel manganese composite hydroxide particles of any one of the claims 7 to 11 to form a lithium mixture; and a calcination step that performs calcination of the mixture formed in the mixing step in an oxygen atmosphere at a temperature of 800 to 980° C.

Preferably, the lithium mixture is adjusted so that the ratio of the sum of the number of metal atoms other than lithium included in the lithium mixture and the number of lithium atoms is 1:0.95 to 1.5.

Moreover, preferably, in the calcination step, temporary calcination has already been performed before calcination at a temperature of 350 to 800° C.

Furthermore, preferably, the oxygen atmosphere during the calcination step is an atmosphere having an oxygen content of 18 to 100% by volume.

The cathode active material of the present invention is expressed by the general formula: $Li_{1+u}Ni_xMn_yCo_zM_tO_2$ (where $-0.05 \leq u \leq 0.50$, $x+y+z+t=1$, $0.3 \leq x \leq 0.7$, $0.1 \leq y \leq 0.55$, $0 \leq z \leq 0.4$, $0 \leq t \leq 0.1$, M is an added element selected from one or more elements from among Mg, Ca, Al, Ti, V, Cr, Zr, Nb, Mo and W), and comprises lithium nickel manganese composite oxide that is formed from a layered hexagonal crystalline lithium containing composite oxide having an average particle size of 2 to 8 μm, a value [(d90−d10)/average particle size], which is an index indicating the extent of the particle size distribution, of 0.60 or less, a specific surface area of 1 to 2 m²/g, and having a hollow structure comprising a hollow section inside the particles and an outer shell section on the outside, with the thickness of the outer shell section being 0.5 to 2.5 μm.

Preferably, the ratio of the thickness of the outer shell section with respect to the particle size of the lithium nickel manganese composite oxide particles is 5 to 45%.

Moreover, preferably, the cathode active material for a non-aqueous electrolyte secondary battery of the present invention is generated by the manufacturing method for cathode active material of the present invention.

In a non-aqueous electrolyte secondary battery of the present invention, the cathode is formed using the cathode active material for a non-aqueous electrolyte secondary battery above.

Effect of the Invention

With the present invention it is possible to industrially provide cathode active material for a non-aqueous electrolyte secondary battery comprising lithium nickel manganese composite oxide having a small and uniform particle size and having high specific surface area by having hollow structure. By using this cathode active material as the cathode material, the high capacity, high output and cyclability of the battery are also good.

The manufacturing methods for manufacturing the cathode active material of the present invention and the nickel manganese composite hydroxide particles as a precursor can both be easily applied to large-scale production, so can be said to have a large industrial value.

BEST MODE FOR CARRYING OUT THE INVENTION

The present invention relates to (1) nickel manganese composite hydroxide particles, which are the precursor for a cathode active material for a non-aqueous electrolyte secondary battery and the manufacturing method thereof, (2) a cathode active material for a non-aqueous electrolyte secondary battery that uses the nickel manganese composite hydroxide and the manufacturing method thereof, and (3) a non-aqueous electrolyte secondary battery that uses the cathode active material for a non-aqueous electrolyte secondary battery for the cathode.

In order to improve the performance of a non-aqueous electrolyte secondary battery, the effect of a cathode active material for a non-aqueous electrolyte secondary battery that is used for the cathode is large. In order to obtain a cathode active material for a non-aqueous electrolyte secondary battery that can obtain excellent battery performance, the particle size, particle size distribution and the specific surface area are important factors, and a cathode active material having a desired particle structure, and that has been adjusted to have a desired particle size and particle size distribution is preferred. In order to obtain that kind of cathode active material, it is necessary to use a nickel manganese composite hydroxide as raw material that has a desired particle structure as well as a desired particle size and particle size distribution.

The invention according to (1) to (3) above is described in detail below, however, first, the nickel manganese composite hydroxide particles and manufacturing method thereof, which are the main features of the present invention, will be explained.

(1-1) Nickel Manganese Composite Hydroxide Particles

The nickel manganese composite hydroxide particles of the present invention are expressed by the general expression: $Ni_xMn_yCo_zM_t(OH)_{2+a}$ (where $x+y+z+t=1$, $0.3 \leq x \leq 0.7$, $0.1 \leq y \leq 0.55$, $0 \leq z \leq 0.4$, $0 \leq t \leq 0.1$, $0 \leq a \leq 0.5$, and M is one or more additional element that is selected from among Mg, Ca, Al, Ti, V, Cr, Zr, Nb, Mo and W), the secondary particles have an average particle size of 3 to 7 µm, the index for indicating the spread of the particle size distribution [(d90−d10)/average particle size] is 0.55 or less, there is a center section comprising fine primary particles, and an outer shell section having a thickness of 0.3 to 3 µm on the outside of the center section that comprises primary particles having a plate shape or needle shape that is larger than the fine primary particles.

The composite hydroxide particles above are particularly suited as the raw material for the cathode active material having a hollow structure of the present invention, so in the following explanation it is presumed that these composite hydroxide particles are used as the raw material for the cathode active material of the present invention.

(Particle Structure)

Figure 5:
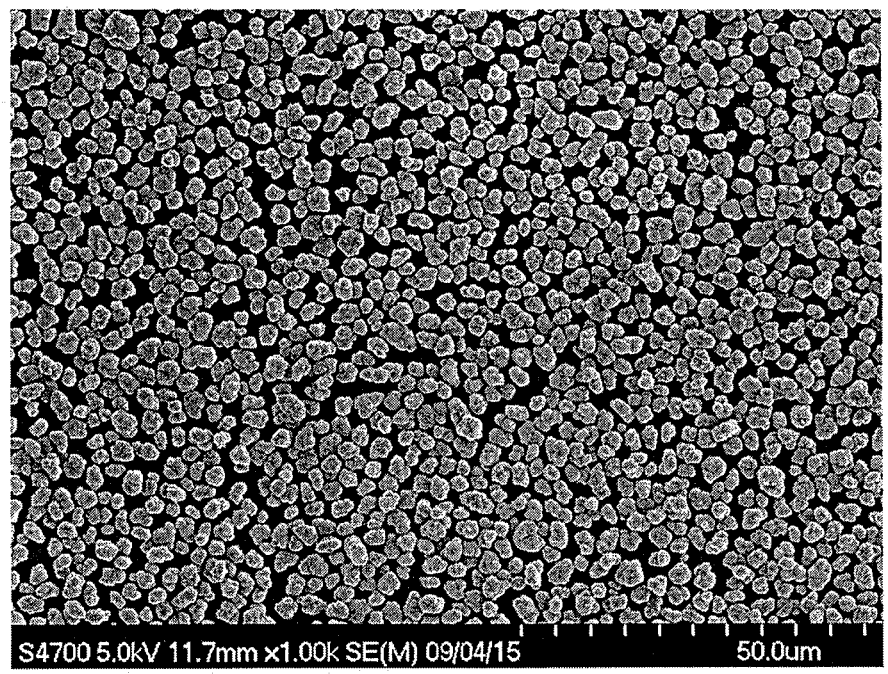
FIG. 5 is an SEM photograph of the nickel manganese composite hydroxide of the present invention (1,000× magnification rate).

As illustrated in the example in FIG. 5, the composite hydroxide particles of the present invention are spherical particles. More specifically, as illustrated in the example in FIG. 6, a plurality of primary particles are aggregated together to form spherical secondary particles, even more specifically, the particles comprise a structure wherein the interior of the particles have a center section comprising fine primary particles, and shell section on the outside of the center section comprising a plate shaped or needle shaped primary particles that are larger than the fine primary particles. With this structure, in the sintering process for forming the lithium nickel manganese composite oxide, which is the cathode active material of the present invention, dispersion of lithium inside the particles is performed sufficiently, so it is possible to obtain a good cathode active material having a uniform distribution of lithium.

Here, the center section is a structure comprising a collection of fine primary particles, so when compared with the outer shell section that comprises larger thick plate shaped primary particles, in the sintering process above, sintering and a contraction reaction start from a lower temperature. After that, sintering and the contraction reaction proceed toward the outer shell where progress is slow, so space occurs in the center section. The reaction activity of the fine crystal of the center section is very high, the contraction rate is also very high, and the fine crystals are absorbed by the large primary particles of the outer shell due to Ostwald growth, so a sufficiently large space is formed inside the center section. As a result, the cathode active material that is obtained after calcination has a hollow structure.

Moreover, it is more preferable that the outer shell of secondary particles be formed with the plate shaped or needle shaped primary particles being aggregated in random directions. By the plate shaped or needle shaped primary particles being aggregated in random directions, nearly uniform spacing occurs between the primary particles, and when mixing and calcining the lithium compound, the molten lithium compound moves inside the secondary particles, and dispersion of the lithium is adequately performed. Furthermore, by aggregating those particles in random directions, absorption of the particles of the center section during the calcination process occurs evenly, so it is possible to form spaces of suitable size inside the cathode active material, and so is preferred from this aspect as well.

In order to form space during the calcination process, preferably the average particle size of the fine primary particles is 0.01 to 0.3 µm, and more preferably is 0.1 to 0.3 µm. Moreover, preferably the average particle size of the plate shaped or needle shaped primary particles, which are larger than the fine primary particles, is 0.3 to 3 µm, and more preferably is 0.4 to 1.5 µm, and particularly, even more preferably is 0.4 to 1.0 µm. When the average particle size of the fine primary particles is less than 0.01 µm, a center section having a sufficient size may not be formed in the composite hydroxide particles, and when the average particle size is greater then 0.3 µm, absorption of the center section is not sufficient, so it is possible that a space of adequate size will not be obtained after calcination. On the other hand, when the average particle size of the plate shaped or needle shaped particles of the outer shell section is less than 0.3 µm, sintering is performed at low temperature during calcination, and it may not be possible to obtain space having an sufficient size, and when greater than 3 µm, in order for the crystallinity of the obtained cathode active material to be suitable, it is necessary to increase the calcination temperature, so sintering will occur between the secondary particles and the particle size of the obtained cathode active material will exceed the range above.

Furthermore, preferably the fine primary particles are plate shaped or needle shaped. By the fine primary particles having these shapes, the density of the center section is sufficiently low, large contraction occurs due to calcination, and a sufficient amount of space is created.

For the secondary particles, it is necessary that the thickness of the outer shell section be 0.3 to 3 µm. When the thickness of the outer shell section is less than 0.3 µm, contraction of the outer shell during calcination is larger, and sintering of the surrounding secondary particles also proceeds, so the form of the secondary particles cannot be maintained. When the thickness exceeds 3 µm the structure of the outer shell becomes dense, so there is a problem in that holes passing through to the center section are not formed, and the center section cannot be used as a reaction surface. From the aspect of stable productivity, the thickness is preferably 0.5 to 1.5 µm.

Moreover, in the case of the secondary particles above, preferably the thickness of the outer shell section is 10 to 45% the particle size of the secondary particles, and more preferably 10 to 40%, and even more preferably 10 to 35%. The cathode active material that is obtained with the composite hydroxide above as the raw material has hollow structure, and the ratio of the thickness of the outer shell section with respect to the particle size is maintained at that ratio for the composite hydroxide secondary particles above. Therefore, by keeping the ratio of the thickness of the outer shell section with respect to the size of the secondary particles within the range above, it is possible to form a sufficient hollow section in the lithium nickel manganese composite oxide particles. When the thickness of the outer shell section is so thin that the ratio with respect to the particle size of the secondary particles is less than 10%, the contraction of the composite hydroxide particles in the calcination process when manufacturing the cathode active material becomes large, and sintering occurs between the secondary particles of the lithium nickel manganese composite oxide, so there is a possibility that the particle size distribution of the cathode active material becomes poor. On the other hand, when the ratio exceeds 45%, problems such as not being able to form a sufficiently large center section may occur.

The particle size of the fine primary particles and the plate shaped or needle shaped primary particles, the thickness of the outer shell section of secondary particles, and the ratio of the thickness of the outer shell section with respect to the particle size of the secondary particles can be measured by using a scanning electron microscope to observe the cross section of the nickel manganese composite hydroxide.

For example, a plurality of nickel manganese composite hydroxide particles (secondary particles) can be embedded in resin or the like, and through cross-section polisher processing or the like, can be put into a state such that the cross section can be observed. The particle size of the fine primary particles and the plate shaped or needle shaped primary particles can be found by measuring as the maximum diameter of the cross section of preferably 10 or more of the primary particles in the secondary particle, and calculating the average.

Moreover, the ratio of the thickness of the outer shell section with respect to the particle size of the secondary particles can be found as described below. From among the secondary particles in the resin above, particles in the center whose cross section can be observed are selected, and at three or more arbitrary locations, the distance between two points where the distance from the outer surface of the outer shell section to the inner surface on the center section side is the shortest is measured, and the average thickness of the outer shell section for each particle is found. By taking the maximum distance between two arbitrary points on the outer surface of the secondary particle to be the particle size of the secondary particle, and dividing the average thickness by the particle size of the secondary particle, the ratio of the thickness of the outer shell section with respect to the particle size is found for each particle. Furthermore, by averaging the ratios that were found for 10 or more particles, it is possible to find the ratio of the thickness of the outer shell section with respect to the particle size of the secondary particles for the nickel manganese composite hydroxide particles above.

(Average Particle Size)

The average particle size of the composite hydroxide particles of the present invention is adjusted to be 3 to 7 μm, and preferably 3.5 to 6.5 μm, and more preferably 4.0 to 5.5 μm. By making the average particle size 3 to 7 μm, the cathode active material that is obtained using the composite hydroxide particles of the present invention as raw material can be adjusted to have a specified average particle size (2 to 8 μm). The particle size of the composite hydroxide particles is correlated with the particles size of the cathode active material that is obtained, so affects the characteristics of a battery that uses this cathode active material as the cathode material.

More specifically, when the average particle size of the composite hydroxide particles is less than 3 μm, the average particle size of the obtained cathode active material also becomes small, and the packing density of the cathode decreases, and the battery capacity per volume decreases. On the other hand, when the average particle size of the composite hydroxide particles exceeds 7 μm, specific surface area of the cathode active material decreases, and by reducing the electrolyte interface the cathode resistance increases, and the output characteristics of the battery decreases.

(Particle Size Distribution)

The composite hydroxide particles of the present invention are adjusted so that the index [(d90−d10)/average particle size)] that indicates the extent of the particle size distribution is 0.55 or less, and preferably 0.52 or less, and more preferably 0.50 or less.

The particle size distribution of the cathode active material is greatly affected by the composite hydroxide particles, which are the raw material, so when fine particles or coarse particles are mixed with the composited hydroxide particles, similar particles also exist in the cathode active material. In other words, when [(d90−d10)/average particle size)] exceeds 0.55 and the extent of the particle size distribution is large, fine particles or coarse particles also exist in the cathode active material.

When the cathode is formed using cathode active material in where there are many fine particles, there is a possibility that heat will be generated due to localized reaction of the fine particles, and together with a decrease in the safety of the battery, the fine particles selectively deteriorate, so the cyclability of the battery becomes poor. On the other hand, when the cathode is formed using cathode active material in which there are many large particles, there is not sufficient reaction area between the electrolyte and the cathode active material, and the output of the battery decreases due to an increase in the reaction resistance.

Therefore, the composite hydroxide particles of the present invention are adjusted so that [(d90−d10)/average particle size] is 0.55 or less, and the range of particle size distribution of the cathode active material that is obtained by using these composite hydroxide particles as raw material becomes small, so it is possible to make the particle size uniform. In other words, the particle size distribution of cathode active material can be adjusted such that [(d90−d10)/average particle size] is 0.60 or less. As a result, in a battery in which cathode active material that is formed using the composite hydroxide particles of the present invention is used as the cathode material, it is possible to achieve good cyclability and high output.

In the index [(d90−d10)/average particle size] that indicates the extent of the particles size distribution, d10 is the particle size when the number of particles of each particle size from the side of small particle size is cumulatively totaled, and that accumulated volume is 10% of the total volume of all particles. Moreover, d90 is the particle size when the number of particles is similarly totaled, and that accumulated volume is 90% the total volume of all particles.

The method for finding the average particle size, d90 and d10 is not particularly limited, however, for example, they can be found from the volume integrated value that is measured using a laser diffraction scattering particle size analyzer. When d50 is used as the average particle size, it is possible to use the particle size when, as in the case of d90, the accumulated volume is 50% the entire particle volume.

(Particle Composition)

The composite hydroxide particles of the present invention are adjusted so that the composition is expressed by the following general expression. By manufacturing a lithium nickel manganese composite oxide with a nickel manganese composite hydroxide having the this composition as the raw material, and when using an electrode having that lithium nickel manganese composite oxide as the cathode active material in a battery, not only is it possible to lower the value of the measured cathode resistance, but it is also possible to improve the battery performance.

General Expression: $Ni_xMn_yCo_zM_t(OH)_{2+a}$ ($x+y+z+t=1$, $0.3 \leq x \leq 0.7$, $0.1 \leq y \leq 0.55$, $0 \leq z \leq 0.4$, $0 \leq t \leq 0.1$, $0 \leq z \leq 0.5$, M is one or more additional element selected from among Mg, Ca, Al, Ti, V, Cr, Zr, Nb, Mo and W.)

When cathode active material with composite hydroxide particles as the raw material is obtained, the composition ratio (Ni:Mn:Co:M) of the composite hydroxide particles is maintained in the obtained cathode active material. Therefore, the composition ratio of the composite hydroxide particles of the present invention is adjusted so as to be the same as the composition ratio that is required for the cathode active material to be obtained.

(1-2) Method for Manufacturing Nickel Manganese Composite Hydroxide Particles

The method for manufacturing the composite hydroxide particles of the present invention is a method for manufacturing nickel manganese composite hydroxide particles by a crystallization reaction, and comprises: a) a nucleation step for performing nucleation, and b) a particle growth step that grows the nucleus that was produced in the nucleation process.

In other words, in the conventional continuous crystallization method, the nucleation reaction and the particle growth reaction proceeded simultaneously in the same tank, so the particle size distribution of the obtained composite hydroxide particles was over a wide range. On the other hand, a feature of the manufacturing method for the composite hydroxide particles of the present invention, is that by clearly separating the time when nucleation reaction occurs (nucleation step) and the time when the particle growth reaction occurs (particle growth step) a narrow particle size distribution is achieved for the obtained composite hydroxide particles.

Moreover, in the present invention, a feature of the nucleation step and the particle growth step is the use of an aqueous solution that does not substantially contain a complex ion formation agent for forming complex ions with nickel, manganese and cobalt. In the case of obtaining nickel manganese complex hydroxide particles by crystallization, normally, a complex ion formation agent, for example an ammonium ion donor such as ammonia aqueous solution, for forming complex ions with nickel, manganese, cobalt and the like put into the solution, however, in the present invention, this kind of complex ion formation agent is not used. By not using a complex ion formation agent, the solubility of nickel, manganese and cobalt into the reaction solution in the nucleation step decreases, and fine primary particles are generated. Moreover, the complex ion formation agent is not used in order to avoid difficulty in controlling the crystallization due to fluctuation in density caused by the volatilization of the complex ion formation agent during crystallization, and secondarily, in order to reduce the load of the drainage process.

In addition to an ammonium ion donor as the complex ion formation agent for forming complex ions with nickel, manganese and cobalt, acetic acid, citric acid and the like that form chelate complex ions with these metals are possible.

Figure 1:
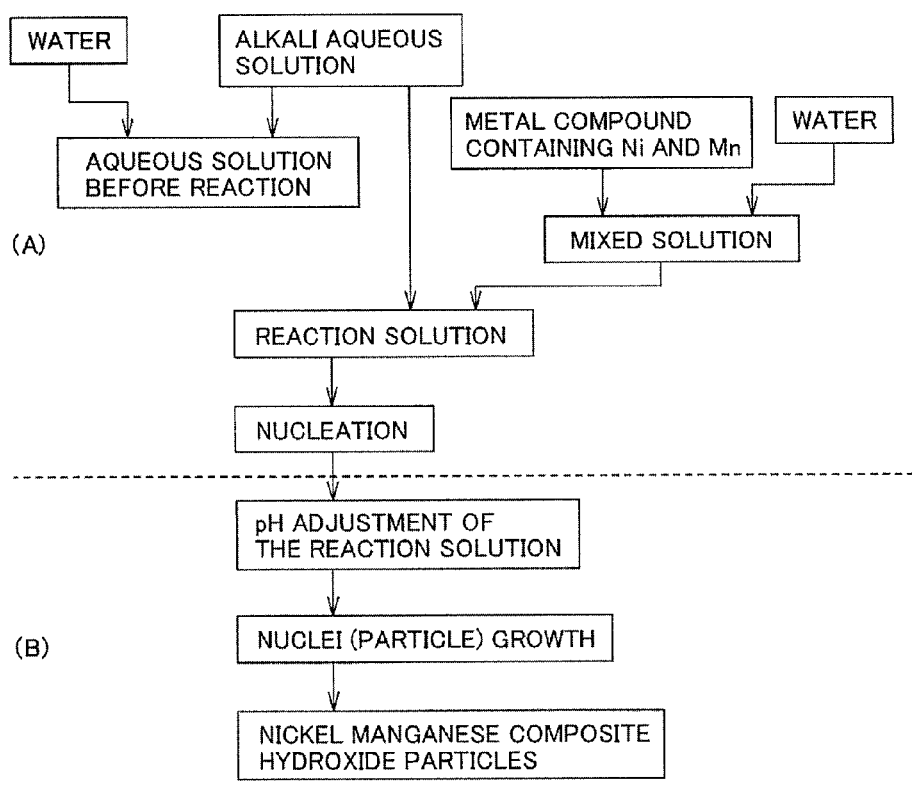
FIG. 1 is a flowchart of a process for manufacturing the nickel manganese composite hydroxide of the present invention.
Figure 2:
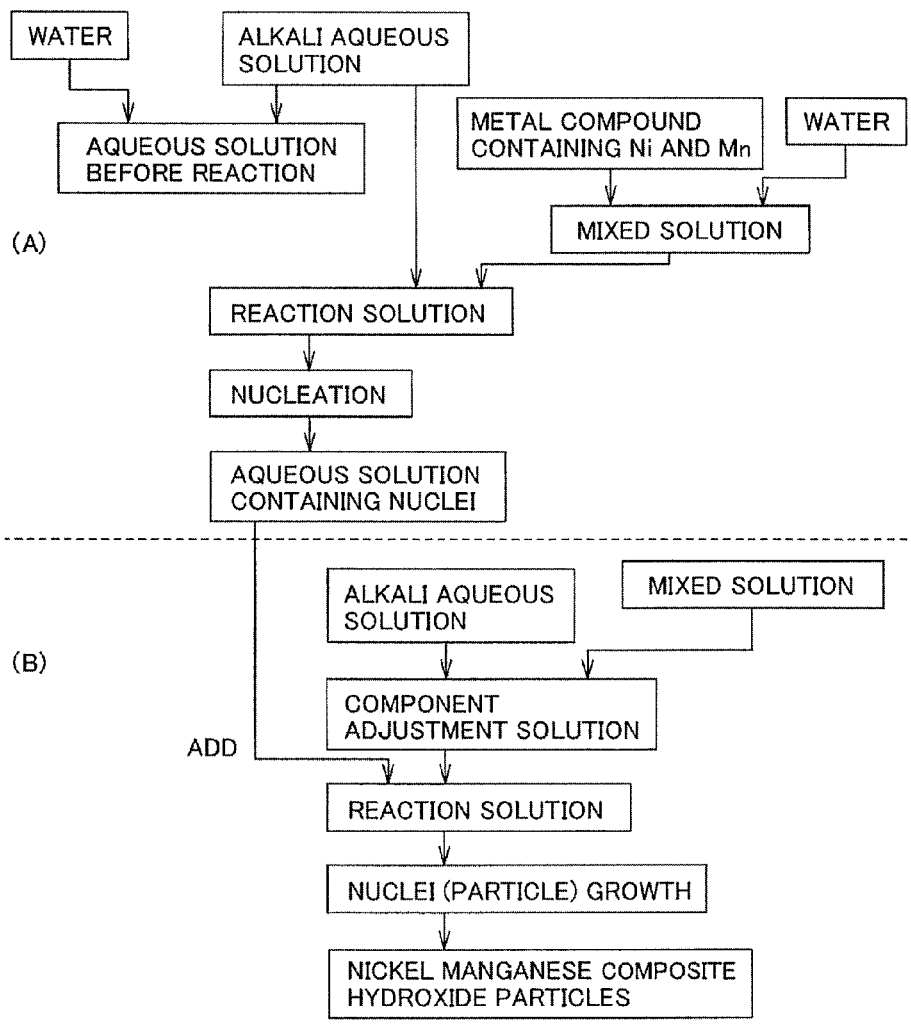
FIG. 2 is a flowchart of another process for manufacturing the nickel manganese composite hydroxide of the present invention.

First, a summary of the method for manufacturing the composite hydroxide particles of the present invention will be explained based on FIG. 1. In FIG. 1 and FIG. 2, (A) corresponds to the nucleation step and (B) corresponds to the particle growth step.

(Nucleation Step)

As illustrated in FIG. 1, first, a plurality of metallic compounds containing at least nickel and manganese are dissolved in water at specified ratios, to make the mixed aqueous solution. In the method for manufacturing the composite hydroxide particles of the present invention, the composition ratio of the metal in the obtained composite hydroxide particles is as a rule the same as the composition ratio of the metals in the mixed aqueous solution.

Therefore, the mixed aqueous solution is made by adjusting the ratio of the metal compounds to be dissolved in water, mainly nickel, manganese and cobalt, so that the composition ratio of the metals in the mixed aqueous solution is the same composition ratio as the metals in the composite hydroxide particles of the present invention. The added elements can be coated over the hydroxide particles in a later step, so in that case the composition ration of the metals in the mixed aqueous solution can be adjusted in consideration of the elements added later. Moreover, the temperature inside the reaction tank is kept at a fixed temperature, so the mixed aqueous solution should be added after being heated to a temperature of 25 to 50° C., and preferably after being heated to 30 to 45° C. When the temperature is less than 25° C., the difference with the temperature in the tank is large, and it becomes difficult to control the temperature in the tank. Moreover, when the temperature exceeds 50° C., the total amount of heat generated resulting from the heat brought by the mixed aqueous solution, the heat generated due to neutralization in the tank, and the heat generated due to friction heat by mixing becomes large, and temperature inside the tank becomes higher than the set temperature.

On the other hand, alkali aqueous solution, such as sodium hydroxide aqueous solution, and water are supplied to the reaction tank and mixed to form an aqueous solution that does not substantially contain a complex ion formation agent that forms complex ions with nickel, manganese and cobalt. This aqueous solution (hereafter, referred to as the "aqueous solution before reaction") is heated with steam or hot water that passes through the jacket and adjusted so that the temperature is 60° C. or greater, and the pH value is adjusted to be within the range 11.5 to 13.5 at a standard solution temperature of 25° C. by adjusting the amount of alkali aqueous solution that is supplied. The pH value of the aqueous solution in the reaction tank can be measured using a typical pH meter.

Here, the meaning of "does not substantially contain" means that the amount contained is less than any amount that would having any effect on the solubility of the metal compounds above in the reaction solution, and the allowed amount differs depending on the kind of complex ion formation agent, however, for example, in the case of ammonium ions, preferably the amount is 1 g/L or less, and more preferably, 0.5 g/L or less, and even more preferably, 0.1 g/L or less. In the case of acetate ions, preferably the amount is 3.5 g/L or less, and more preferably, 1.8 g/L or less, and even more preferably 0.35 g/L. In any case, it is particularly preferred that the amount cannot be detected by normal analysis. When the amount of this kind complex ion formation agent that is contained in the aqueous solution for nucleation exceeds the allowed amount, the solubility of nickel and cobalt increases, so the deposition rate of composite hydroxides decreases and it becomes easy for primary particles to grow, so it becomes impossible to form a nucleus in which fine primary particles are aggregated, or in other words, it becomes impossible to form a nucleus that will become the center section of secondary composite hydroxide particles, and therefore it becomes easy to obtain solid particles.

Moreover, preferably the atmosphere inside the reaction tank is adjusted so that the oxygen concentration is 10 volume % or less. Controlling this atmosphere can be adjusted by using an inert gas such as nitrogen or argon. More specifically, adjustment is possible by adjusting the flow rate of air and inert gas in the atmospheric gas that flows into the reaction tank beforehand so that the oxygen concentration becomes a specified level, and causing a fixed amount of atmospheric gas to circulate.

In the reaction tank, after the atmosphere, and the temperature and pH of the aqueous solution before reaction have been adjusted, the mixed aqueous solution is supplied to the reaction tank while stirring the aqueous solution before reaction. As a result, the aqueous solution before reaction is mixed with the mixed aqueous solution, and thus an aqueous solution for nucleation, which is the reaction solution for the nucleation step, is formed, and a minute nucleus of composite hydroxide is formed in the aqueous solution for nucleation. At this time, the temperature and pH of the aqueous solution for nucleation are within the range above, so the formed nuclei do not grow much, and generation of the nuclei has priority.

The pH value of the aqueous solution for nucleation changes during formation of the nuclei due to the supply of mixed aqueous solution, so alkali aqueous solution is supplied together with mixed aqueous solution to the aqueous solution for nucleation, and the pH of the aqueous solution for nucleation is controlled so that the pH value at a standard solution temperature of 25° C. is kept within the range 11.5 to 13.5. Moreover, the temperature is controlled so that it is kept at 60° C. or higher.

By supplying mixed aqueous solution and alkali aqueous solution to the aqueous solution for nucleation, new nuclei are continuously generated in the aqueous solution for nucleation. After a specified number of nuclei are generated in the aqueous solution for nucleation, the nucleation step ends. Whether or not the specified number of nuclei has been generated is determined according to the amount of metal salt added to the aqueous solution for nucleation.

(Particle Growth Step)

After the nucleation step has finished, the atmosphere inside the reaction tank is maintained and the temperature is kept at 60° C. or greater, and the pH of the aqueous solution for nucleation at a standard solution temperature of 25° C. is adjusted to 9.5 to 11.5, and preferably, to 9.5 to 11.0, so that pH value is lower than the pH value during the nucleation step, and an aqueous solution for particle growth, which is the reaction aqueous solution for the particle growth step, is obtained. More specifically, controlling the pH during this adjustment is performed by adjusting the amount of alkali aqueous solution that is supplied.

By keeping the pH value of the aqueous solution for particle growth within the range above, the growth reaction of the nuclei occurs with priority over the formation reaction of nuclei, so in the particle growth step, hardly any new nuclei are formed in the aqueous solution for particle growth, and the nuclei are grown (particle growth) and composite hydroxide particle having a specified particle size are formed.

Similarly, as particles are grown by supplying mixed aqueous solution, the pH value of the aqueous solution for particle growth changes, so the pH value of the aqueous solution for particle growth is controlled by supplying alkali aqueous solution together with mixed aqueous solution to the aqueous solution for particle growth so that the pH value is within the range 9.5 to 11.5 at a standard solution temperature of 25° C. After that, at the instant when the composite hydroxide particles have grown to a specified particle size, the particle growth step ends. The end of the particle growth step can be determined easily from preliminary testing from the amount of metal salt added to the reaction solutions in both the nucleation step and particle growth step, and when finding the relationship with the obtained particles, from the amount of metal salt added in each step.

As described above, in the case of the method for manufacturing composite hydroxide particles above, formation of nuclei takes precedence in the nucleation step with hardly any nucleus growth occurring, however, in the particle growth step only nucleus growth occurs, and hardly any new nuclei are formed. Therefore, in the nucleation step it is possible to form homogeneous nuclei having a narrow particle size distribution range, and in the particle growth process, it is possible to homogeneously grow nuclei. Consequently, in the method for manufacturing composite hydroxide particles, it is possible to obtain homogeneous nickel manganese composite hydroxide particles having a narrow particle size distribution range.

In the case of the manufacturing method above, in both steps, metallic ions crystallize as nuclei or composite hydroxide particles, so the ratio of the liquid component to the metallic component in the reaction solutions increases. In that case, apparently, the density of the mixed aqueous solution that is supplied is decreased, and particularly in the particle growth step, there is a possibility that composite hydroxide particles will not grow sufficiently.

Therefore, preferably, in order to suppress the increase of liquid component, part of the liquid component in the aqueous solution for particle growth is drained to outside the reaction tank after the nucleation step ends and during the particle growth step. More specifically, the supply of mixed aqueous solution and alkali aqueous solution to the aqueous solution for particle growth and mixing is stopped, the nuclei and composite hydroxide particles are caused to precipitate out, and the supernatant liquid of the aqueous solution for particle growth is drained out. As a result, it is possible to increase the relative concentration of mixed aqueous solution in the aqueous solution for particle growth. Then, with the relative concentration of the mix aqueous solution high, it is possible to grow composite hydroxide particles, so it is possible to make the particle size distribution of the composite hydroxide particles even narrower, and thus it is also possible to increase the density of the composite hydroxide particles as secondary particles.

Moreover, in the embodiment illustrated in FIG. 1, after the nucleation step ends, an aqueous solution for particle growth is formed by adjusting the pH of the aqueous solution for nucleation, and then particle growth step is performed after the nucleation step, so there is an advantage in that it is possible to quickly change to the particle growth step. Furthermore, there is the advantage that changing from the nucleation step to the particle growth step can be performed easily by simply adjusting the pH of the reaction solution, and adjusting the pH can also be performed easily by temporarily stopping the supply of alkali aqueous solution. In the case of using an inorganic acid that is the same kind as the acid of the metallic compounds, for example, sulfate, the pH of the reaction solution can also be adjusted by adding sulfuric acid to the reaction solution.

However, in another embodiment as illustrated in FIG. 2, separate from the aqueous solution for nucleation, a component adjustment solution whose pH is adjusted to correspond to the particle growth step is formed, and a solution containing the nuclei that were formed in the nucleation step in a separate tank (aqueous solution for nucleation, and preferably, the aqueous solution from which part of liquid component has been removed) is added to this component adjustment solution to form a reaction solution, and the particle growth step can be performed with this reaction solution as the aqueous solution for particle growth. Similar to the aqueous solution before reaction, the component adjustment solution in this case does not substantially contain a complex ion formation agent that forms complex ions with nickel, manganese and cobalt, the temperature of the solution is kept at 60° C. or greater, and the pH value is controlled so that when measured at standard solution temperature of 25° C. the pH value is 9.5 to 11.5, and is less than the pH value in the nucleation step.

In this case, it is possible to separate the nucleation step and particle growth step more completely, so the state of the reaction solution in each step can be taken to be an optimum condition for the step. Particularly, at the time when the particle growth step starts, the pH of the aqueous solution for particle growth can be taken to be the optimum condition. Therefore, the range of the particle size distribution of the nickel manganese composite hydroxide particles that are formed in the particle growth step can be narrower and more homogeneous.

(pH Control)

As described above, in the nucleation step, the pH value of the reaction solution must be controlled so that at a standard solution temperature of 25° C. the pH value is within the range 11.5 to 13.5, and preferably, within the range 11.8 to 13.3, and more preferably, within the range 12.0 to 13.1. When the pH value exceeds 13.5, the nuclei that are formed are too fine, and there is a problem that the reaction solution becomes a gel. Moreover, when the pH value is less than 11.5, the nucleus growth reaction occurs together with nucleation, so the range of the particle size distribution of the formed nuclei becomes large, and heterogeneous. In other words, in the nucleation step, by controlling the pH value of the reaction solution within the range above, it is possible to suppress nucleus growth, and promote only nucleation, and the formed nuclei are homogeneous and the particle size distribution range can be kept narrow.

On the other hand, in the particle growth step, the pH value of the reaction solution must be controlled so that at a standard solution temperature of 25° C. the pH value is within the range 9.5 to 11.6, and preferably, within the range 9.5 to 11.0, and more preferably, within the range 10.0 to 10.6. When the pH value exceeds 11.5, the amount of newly formed nuclei increases, and fine secondary particles are formed, so hydroxide particles having a good particle size distribution cannot be obtained. Moreover, when the pH value is less than 9.5, the solubility of nickel is high, and the amount of metal ions that remain in the solution without precipitating out increases, so production efficiency becomes poor. In other words, in the particle growth step, by controlling the pH of the reaction solution within the range above, it is possible to cause only growth of the nuclei formed in the nucleation step to occur and suppress the formation of new nuclei, and thus the obtained nickel manganese composite hydroxide particles are homogeneous and the particle size distribution range can be kept narrow.

In both the nucleation step and the particle growth step, preferably the range of fluctuation of the pH is kept within the set value ±0.2. When the range of fluctuation of the pH is large, nucleation and particle growth do not become fixed, and there is a possibility that uniform manganese composite hydroxide particles having a narrow particle size distribution range will not be obtained.

When the pH value is 11.5, this pH value is the boundary condition between nucleation and nucleus growth, so, depending on whether or not there are nuclei in the reaction solution, this pH value will become the condition for the nucleation step or the particle growth step. In other words, after the pH value for the nucleation step is made to be greater than 11.5 a large quantity of nuclei are formed, when the pH value for the particle growth step is made to be 11.5, there is a large quantity of nuclei in the reaction solution, so nucleus growth occurs with priority, and hydroxide particles have a narrow particle size distribution and relative large particle size are obtained.

On the other hand, when there are no nuclei in the reaction solution, or in other words, when the pH value during the nucleation step is 11.5, there are no nuclei that have grown, so the formation of nuclei takes precedence, and by lowering the pH value of the particle growth step to be less than 11.5, the nuclei that are formed grow and good hydroxide particles are obtained.

In either case, the pH value of the particle growth step should be controlled to be a value that is less than the pH value in the nucleation step, and in order to clearly separate nucleation from particle growth, the pH value of the particle growth step is preferably at least 0.5 less than the pH value of the nucleation step, and even more preferably at least 1.0 less.

(Nucleation Amount)

The amount of nuclei formed during the nucleation step is not particularly limited, however, in order to obtain composite hydroxide particles having good particle size distribution, preferably the amount is 1% to 2% of the total volume, or in other words the amount of all metal salts supplied to obtain the composite hydroxide particles, and more preferably 1.5% or less. As described above, the amount of nucleation can be controlled by finding through preliminary testing the relationship between the amount of metal salts added to the reaction solution and the amount of nuclei obtained.

(Controlling the Particle Size of Composite Hydroxide Particles)

The particle size of the composite hydroxide particles above can be controlled by the time of the particle growth step, so by continuing the particle growth step until the particles have been grown to a desired particle size, it is possible to obtain composite hydroxide particles having a desired particle size.

Moreover, the particle size of the composite hydroxide particles can be controlled not only by the particle growth step, but also by the pH value of the nucleation step and the amount of raw material added for nucleation. In other words, by making the pH value during nucleation the high pH value side, or by increasing the amount of raw material added by increasing the nucleation time, number of nuclei formed is increased. As a result, even when the particle growth conditions are kept the same, it is possible to make the particle size of the composite hydroxide particles small. On the other hand, by performing control to reduce the number of nuclei formed, it is possible to increase the particle size of the obtained composite hydroxide particles.

The shape and size of the primary particles can be controlled by controlling the temperature and pH value as described above. For example, of the particles of the secondary particles, in order to made the average particle size of the fine primary particles of the nuclei 0.01 to 0.3 µm, the temperature of the nucleation step is controlled to be 60° C. or greater. On the other hand, in order to make the primary particles of the outer shell section plate shaped or needle shaped by crystallizing around the nuclei in the particle growth step, and make the average particle size 0.3 to 3 µm, the pH of the particle growth step is controlled to be 9.5 or greater.

Furthermore, in order to make the thickness of the outer shell section be within the range 0.3 to 3 µm, control is performed to make the solubility high. Also, in order to make the ratio of the thickness of the outer shell with respect to the particle size of the secondary particles 10 to 45%, the amount of crystallization is controlled at a temperature of 60° C. or greater, and a pH of 9.5 to 12.

In the following, the conditions for the metallic compounds, reaction temperature and the like are explained, however, the difference between the nucleation step and the particle growth step is just the range for controlling the pH of the reaction solutions, with the conditions such as the metallic compounds, reaction temperature and the like essentially being the same in both steps.

(Nickel, Manganese and Cobalt Sources)

Compounds containing the target metals are used as the metal sources for nickel, manganese and cobalt. The compounds used are preferably compounds that are water soluble such as nitrates, sulfates and hydrochlorates. From the aspect of mixing into the hydroxide particles, and disposing of the waste liquid, preferably sulfates, such as nickel sulfate, manganese sulfate and cobalt sulfate are used.

(Added Element Sources)

Preferably, compounds that are water soluble are used as the sources of the added elements (one or more element is selected from among the elements Mg, Ca, Al, Ti, V, Cr, Zr, Nb, Mo and W); for example, titanium sulfate, ammonium peroxotitanic, titanium potassium oxalate, vanadium sulfate, ammonium vanadate, chromium sulfate, potassium chromate, zirconium sulfate, niobium oxalate, ammonium molybdate, sodium tungstate, ammonium tungstate, and the like can be used, When uniformly dispersing the added elements inside the composite hydroxide particles, it is possible to precipitate out the added elements into the composite hydroxide particles in a uniformly dispersed state by adding additives that contain the added elements.

Moreover, when covering the surface of the composite hydroxide particles with the added elements, for example, by forming a slurry of composite hydroxide particles in an aqueous solution that includes the added elements, and performing control so that the pH becomes a specified value, then adding an aqueous solution that includes one or more kind of added element and depositing the added elements onto the surface of the composite hydroxide particle by a crystallization reaction, it is possible to uniformly cover the surface with the added elements. In this case, it is also possible to use an alkoxide solution added elements instead of an aqueous solution containing added elements. Furthermore, it is also possible to cover the surface of the composite hydroxide particles with added elements by spraying the composite hydroxide particles with an aqueous solution or slurry containing the added elements, and drying the liquid. Moreover, the surface can be covered by a method of spraying and drying a slurry in which the composite hydroxide particles and salt including one or more added element are suspended, or mixing a composite hydroxide and salt containing one or more added element using a solid-phase method.

When covering the surface with added elements, by reducing the atomic ratios of the added element that exist in the mixed solution by just the amount of covering, it is possible to match the atomic ratios with the atomic ratios of the metal ions of the obtained composite hydroxide particles. The step of covering the surface of the particles with added elements can also be performed for the particles after the composite hydroxide particles have been heated.

(Mixed Solution Concentration)

Preferably, the concentration of the mixed solution is 1 to 2.6 mol/L for the total metallic compounds, and preferably 1.5 to 2.2 mol/L. When the concentration of the mixed solution is less than 1 mol/L, the amount of crystallization per reaction tank decreases, so productivity decrease, which is not preferable.

On the other hand, when the salt concentration of the mixed solution exceeds 2.6 mol/L, the concentration exceeds the saturated concentration at normal temperature, so crystals are reprecipitated and there is a danger that piping of the equipment will become blocked.

Moreover, the metallic compounds do not need to be supplied to the reaction tank as a mixed solution, and, for example, when using metallic compounds that are formed by reacting when mixed, separate metallic compound solutions can be prepared and the individual solutions of metallic compounds can be supplied at the same time to the reaction tank so that total concentration of metallic compound solution is within the range above.

Furthermore, that amount of mixed solution or amount of individual metallic compound solutions that are supplied to the reaction tank should be such that the concentration of crystallization at the time that the crystallization reaction ends is generally 30 to 200 g/L, and preferably 80 to 150 g/L. When the concentration of crystallized material is less than 30 g/L, there is insufficient aggregation of primary particles, and when the concentration exceeds 200 g/L, the mixed solution that is added is not sufficiently dispersed inside the reaction tank, so there is a possibility that there will be deviation in particle growth.

(Reaction Temperature)

In the reaction tank, it is necessary to adjust the reaction temperature to be 60° C. or greater, and preferably 60 to 90° C., and particularly it is preferred that the temperature be adjusted to be 60 to 80° C. With the reaction temperature being within this range, it is possible to dissolve the necessary amount of nickel, manganese and cobalt metals for the crystallization reaction at the proper and fixed solubility without having to add a complex ion formation agent. When the reaction temperature is less than 60° C., the temperature is low, so the solubility of nickel, manganese and cobalt becomes too low, it becomes for nuclei to be formed, and there is a tendency for it to become difficult to control the reaction. Even when the temperature is above 90° C., the crystallization reaction is possible, however, water vaporization is accelerated, so control of the reaction becomes difficult, and from an industrial aspect, the cost and safety risk of maintaining a high temperature increases, which is not preferable.

In order to keep the reaction temperature at 60° C. or greater, it is preferable in the nucleation step that both the aqueous solution before reaction and the reaction solution be 25 to 50° C., and more preferably 30 to 45° C. Moreover, in the particle growth step as well, continuing from the nucleation step, it is preferable that the temperature of the reaction solution be maintained at 60° C. or greater, and that the temperature of the added mixed solution be 25 to 50° C., and more preferably 30 to 45° C.

(Alkali Aqueous Solution)

In regards to the alkali aqueous solution that is used to adjust the pH of the reaction solution, as long as the solution is not a solution that forms complex ions with nickel, manganese and cobalt, the solution is not particularly limited; for example, it is possible to use an alkali metal hydroxide aqueous solution such as sodium hydroxide, potassium hydroxide an the like, however, from the aspect of cost and ease of handling, sodium hydroxide is preferred. In the case of alkali metal hydroxide, it is possible to supply that alkali metal hydroxide directly to the reaction solution, however, from the aspect of ease of control the pH of the reaction solution in the reaction tank, adding the alkali metal hydroxide to the reaction solution in the reaction tank as an aqueous solution is preferred.

The method for adding the alkali aqueous solution to the reaction tank is also not particularly limited, and can be added using a pump capable of flow control, such as a constant rate pump, while sufficiently stirring the reaction solution so that the pH value of the reaction solution is kept within the specified range.

(Atmosphere During Crystallization)

In the nucleation step, from the aspect of suppressing oxidation of cobalt and manganese and stably forming particles, preferably the oxygen concentration of the space inside the reaction tank must be controlled to 10% by volume or less, and more preferably, 5% by volume or less, and even more preferably, 1% by volume or less. Even in the particle growth step it is important to control oxidation, and it is necessary to similarly control the oxygen concentration of the space inside the reaction tank. The oxygen concentration of the atmosphere can be adjusted, for example, using an inert gas such as nitrogen, argon or the like. It is possible to constantly cause a fixed amount of atmospheric gas to circulate inside the atmosphere as a method for adjusting the oxygen concentration inside the atmosphere to a specified concentration.

(Crystallization Time)

The crystallization times in the nucleation step and the particle growth step are appropriately selected according to the target particle size of the composite hydroxide particles. For example, when trying to obtain secondary particles that are within the specified range of the present invention by using a mixed solution (1.8 mol/L) of nickel sulfate and manganese sulfate and a sodium hydroxide solution (25% by volume), the nucleation step is preferably 20 seconds to 4 minutes, and the particle growth step is preferably 3 to 4 hours. When the nucleation step is less than 20 seconds, it is not possible to form a sufficient amount of nuclei, and when the nucleation step exceeds 4 minutes, too many nuclei are formed, so a problem occurs in that there is variation in the particle size due to aggregation. On the other hand, when the particle growth step is less than 3 hours, there is not enough time for particle growth, so it becomes difficult to control the particle size, and it is not possible to obtain uniform secondary particles. When the particle growth step exceeds 4 hours, the average particle size of the secondary particles exceeds the desired range, and a problem occurs in that productivity decreases. From the aspect of productivity, preferably the nucleation step is 30 seconds to 3 minutes 30 seconds, and the particle growth step is 3 hours 30 seconds to 4 hours.

(Manufacturing Equipment)

In the method for manufacturing composite hydroxide particles of the present invention, an apparatus is used that does not collect the produced material until the reaction is complete. For example, the apparatus is a typically used batch reaction tank in which a mixer provided. When using this kind of apparatus, a problem of collecting growing particles at the same time as the overflow liquid, such as occurs in a continuous crystallization apparatus that collects the produced material by a typical overflow, does not occur, so it is possible to obtain particles having a narrow particle size distribution and uniform particle size.

Moreover, preferably the reaction atmosphere is controlled, so using an apparatus, such as a sealed apparatus, that is capable of atmosphere control is preferred. By using such an apparatus, it is possible to manufacture composite hydroxide particles having the structure above, and it is possible to uniformly promote the nucleation reaction and particle growth reaction, so it is possible to obtain particles having a good particle size distribution, or in other words, particles having a narrow particle size distribution range.

(2-1) Cathode Active Material for a Non-Aqueous Electrolyte Secondary Battery

The cathode active material of the present invention is lithium nickel manganese composite oxide particles that are represented by the general formula: $Li_{1+u}Ni_xMn_yCo_zM_tO_2$ (where $-0.05 \leq u \leq 0.50$), $x+y+z+t=1$, $0.3 \leq x \leq 0.7$, $0.1 \leq y \leq 0.55$, $0 \leq z \leq 0.4$, $0 \leq t \leq 0.1$, and M is at least one kind of added element selected from among Mg, Ca, Al, Ti, V, Cr, Zr, Nb, Mo and W), and has a layered hexagonal crystal structure. A cathode active material having a layered hexagonal crystal structure, it advantageous in that when compared with a cathode active material having a spinel structure, has excellent theoretical capacity density, and cyclability.

(Composition)

The cathode active material of the present invention is lithium nickel manganese composite oxide particles, and the composition thereof is adjusted so as to satisfy the general formula above.

In the cathode active material of the present invention, "u", which indicates the surplus amount of lithium, is within the range $-0.5$ to $0.50$. When the surplus amount "u" of lithium is less than $-0.05$, the reaction resistance of the cathode of the non-aqueous electrolyte secondary battery that uses the obtained cathode active material becomes large, so the output of the battery becomes low. On the other hand, when the surplus amount "u" of lithium exceeds 0.50, the initial discharge capacity when the cathode active material above is used for the cathode of the battery decreases, and the reaction resistance of the cathode also increases. In order to further reduce the reaction resistance, preferably the surplus amount "u" of Lithium is no less 0.10 and no greater than 0.35.

Moreover, the nickel (Ni), manganese (Mn) and cobalt (Co), together with the Li, make up the basic structure of the lithium-containing composite oxide having layered hexagonal crystal structure. The atomic ratios "x", "y", "z" that indicate the amounts contained of these elements are determined for the non-aqueous electrolyte secondary battery that uses the obtained cathode active material in consideration of battery capacity, cyclability and safety. The value of "x" is 0.3 to 0.7, and preferably 0.33 to 0.65; the value of "y" is 0.1 to 0.55, and preferably 0.2 to 0.5; and the value of "z" is 0.4 or less, and preferably 0.35 or less.

As expressed in the general formula above, the cathode active material of the present invention is preferably adjusted so that the lithium nickel manganese composite oxide particles contain added element(s) M. By containing element(s) M above, it is possible to improve the durability, and output characteristics of a battery that uses this cathode active material.

Particularly, by uniformly distributing the added element on the surface or inside the particles, it is possible to obtain the above effect in the whole of the respective particles, and together with obtaining the effect above by adding a small amount, it is possible to suppress a decrease in capacity. Furthermore, in order to obtain the effect by adding an even smaller amount, preferably the concentration of added element on the surface is higher than that inside the particles.

When the atomic ratio "t" of the added element(s) M with respect to all metal atoms (Ni, Mn, Co and added element(s) M) exceeds 0.1 the metal elements that contribute to the Redox reaction decrease, so the battery capacity decreases, which is not preferred. Therefore, the added element(s) M is adjusted so that the atomic ratio is within the range above.

(Average Particle Size)

The cathode active material of the present invention has an average particle size of 2 to 8 μm. When the average particle size is less than 2 μm, the packing density of particles when the cathode is formed decreases, and the battery capacity per volume of the cathode decreases. On the other hand, when the average particle size exceeds 8 μm, the specific surface area of the cathode active material decreases, and by the interface with the electrolyte of the battery decreasing, the resistance of the cathode increases and the output characteristic of the battery decreases.

Therefore, by adjusting the cathode active material so that the average particle size is preferably 2 to 8 μm, or more preferably 3 to 6.5 μm, it is possible to increase the battery capacity per volume of the battery that uses this cathode active material for the cathode, and it is possible to obtain excellent battery characteristics such as safety and high output.

(Particle Size Distribution)

Figure 7:
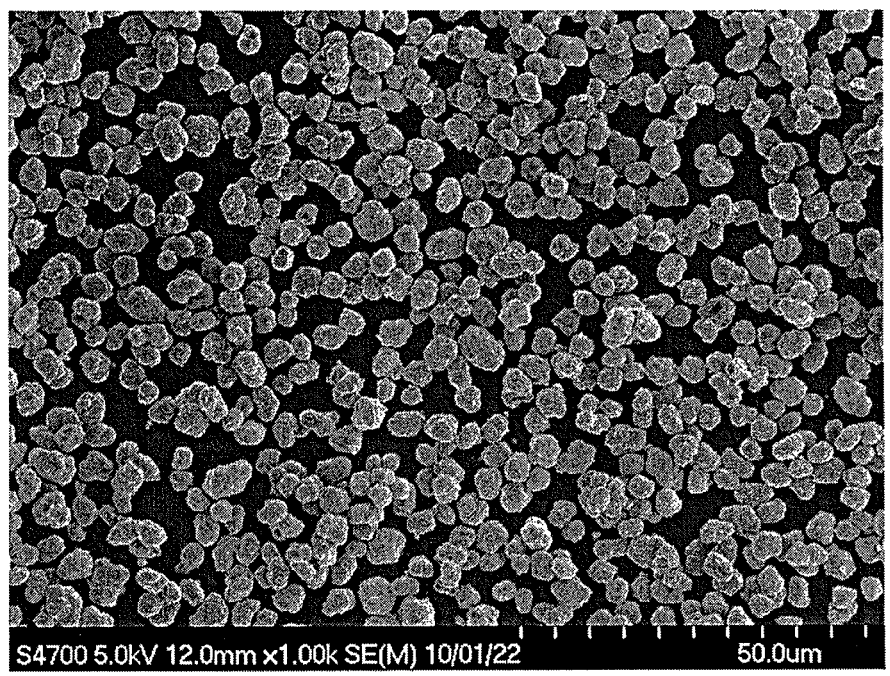
FIG. 7 is an SEM photograph of the lithium nickel manganese composite oxide, which is a cathode active material, of the present invention (1,000× magnification rate).

As illustrated in FIG. 7, for the cathode active material comprises highly homogeneous lithium nickel manganese composite oxide secondary particles having an index [(d90−d10)/average particle size] that indicates the size of the particle distribution of 0.60 or less, and an average particle size of 2 to 8 μm.

For the cathode active material of the present invention, the index [(d90−d10)/average particle size] that indicates the size of the particle size distribution is 0.60 or less, and preferably 0.55 or less, and even more preferably 0.52 or less.

When particle size distribution is wide, there are many fine particles having a particle size that is very small with respect to the average particle size, or coarse particles having a particle size that is very large with respect to the average particle size. When the cathode is formed using a cathode active material having many fine particles, there is a possibility that heat will be generated due to localized reaction of the fine particles, and together with a decrease in safety, fine particles selectively deteriorate, causing the cyclability to become poor. However, when the cathode is formed using cathode active material having many coarse particles, there is not sufficient reaction area for the electrolyte and cathode active material, and thus the battery output decreases due to an increase in reaction resistance.

Therefore, by making the index [(d90−d10)/average particle size] described above 0.60 or less, it is possible to reduce the ratio of fine particles or coarse particles in the particle size distribution of cathode active material, and a battery that uses this cathode active material for the cathode is very safe, and has good cyclability and battery output characteristics. The average particle size, d90 and d10 are the same as those used for the composite hydroxide particles, and measurement is performed in the same way.

(Particle Structure)

Figure 8:
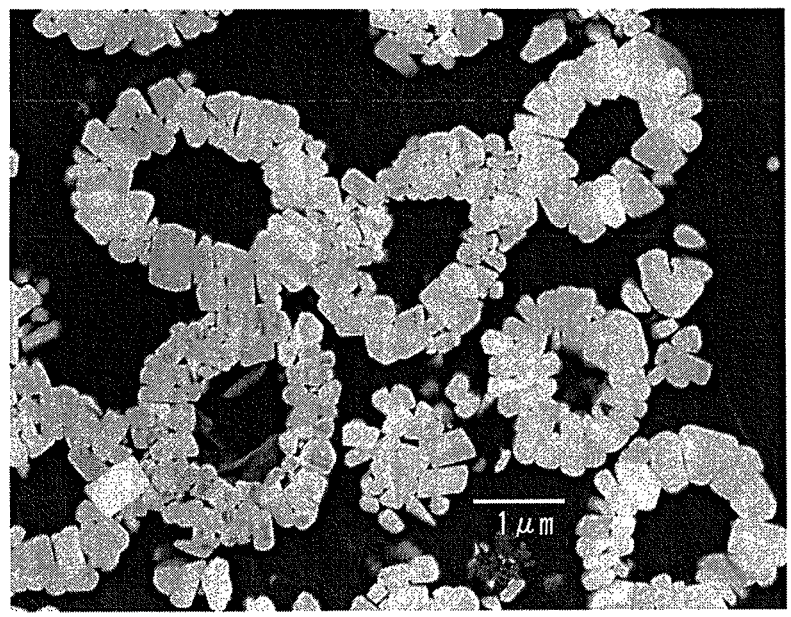
FIG. 8 is an SEM photograph of a cross section of the lithium nickel manganese composite oxide, which is a cathode active material, of the present invention (10,000× magnification rate).

As illustrated in FIG. 8, a feature of the cathode active material of the present invention is the hollow structure comprising a hollow section inside the secondary particles and an outer shell section on the outside. By having this kind of hollow structure, it is possible to increase the reaction area, and electrolyte enter inside from the particle boundaries or space between the primary particles of the outer shell, and lithium is inserted and removed at the reactive interface on the surface of the primary particles on the hollow side inside the particles as well, so mobility of Li ions and electrons is not hindered, and it is possible to increase the output characteristic.

In the present invention, the thickness of the outer shell section is within the range 0.5 to 2.5 μm. Preferably the range is 0.5 to 2 μm, and it is particularly preferred that the range be 0.6 to 1.8 μm. When the thickness of the outer shell section is less than 0.5 μm, the hollow section becomes too large, packing into the electrode becomes worse, the strength of the secondary particles is insufficient, and during formation of the electrode, the particles are broken and become fine; and when the thickness of the outer shell section exceeds 2.5 μm, the hole connecting with the hollow section are covered by the particles of the outer shell section, so a problem occurs in that the hollow structure cannot be taken advantage of and the characteristics decrease.

Moreover, preferably the ratio of the thickness of the outer shell section with respect to the particle size is 5 to 45% and more preferably, 5 to 38%. When the ratio of the thickness of the outer shell section with respect to the particle size is less than 5%, the strength of the lithium nickel manganese composite oxide particles decreases, so handling the powder, and when used in a battery cathode, the particles break down and become fine particles, making the characteristics poor. On the other hand, when the ratio of the thickness of the outer shell section with respect to the particle size exceeds 45%, only a small amount of electrolyte enters inside the hollow section inside the particles from the particle boundaries and spaces, and the surface area that contributes to the battery reaction becomes smaller, so the cathode resistance increases and the output characteristic decreases.

The thickness of the outer shell section of lithium nickel manganese composite oxide particles and the ratio of the thickness of the outer shell section with respect to the particle size can be found in the same ways as for the composite hydroxide particles.

(Specific Surface Area)

In the case of the cathode active material of the present invention, the specific surface area is 1 to 2 $m^2/g$, and preferably 1.2 to 1.8 $m^2/g$. When the specific surface area is 1 $m^2/g$ or greater, the reaction area of the cathode active material and the electrolyte is sufficiently large, so a battery that uses a cathode that is formed suing this cathode active material can become a high-output battery. On the other hand, when the specific surface area is too large, the particle size becomes to small, and the amount of active material that can be charged inside a battery having limited volume is reduced, and the capacity per volume of the battery decreases. Therefore, for the cathode active material of the present invention, the upper limit for the specific surface area is taken to be 2 $m^2/g$.

(Characteristics)

When the cathode active material above is used for example in the cathode of a 2032 type coin battery, when cobalt is not added, high initial discharge capacity of 200 mAh/g or greater is obtained, and even when cobalt is added at an atomic ratio of 30% of the entire metallic elements other than lithium, a high initial discharge capacity of 150 mAh/g is obtained, and low cathode resistance and high cycle capacity retention is obtained, which are excellent characteristics for a cathode active material for a non-aqueous electrolyte secondary battery.

(2-2) Method for Manufacturing Cathode Active Material for a Non-Aqueous Electrolyte Secondary Battery As long as the method for manufacturing the cathode active material of the present invention is such that the cathode active material has the average particle size, particle size distribution and particle structure above, the method is not particularly limited, however, by employing the method below the cathode active material can surely be manufactured, so is preferred.

Figure 3:
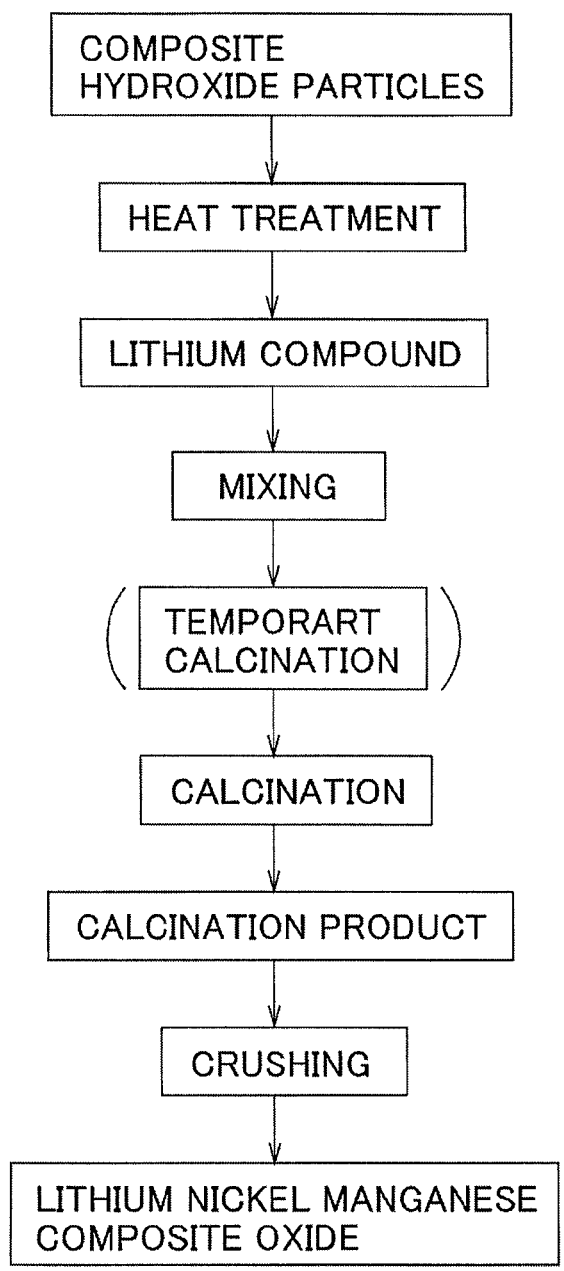
FIG. 3 is a flowchart of a process for manufacturing a lithium nickel manganese composite oxide, which is a cathode active material, from the nickel manganese composite hydroxide of the present invention.
Figure 4:
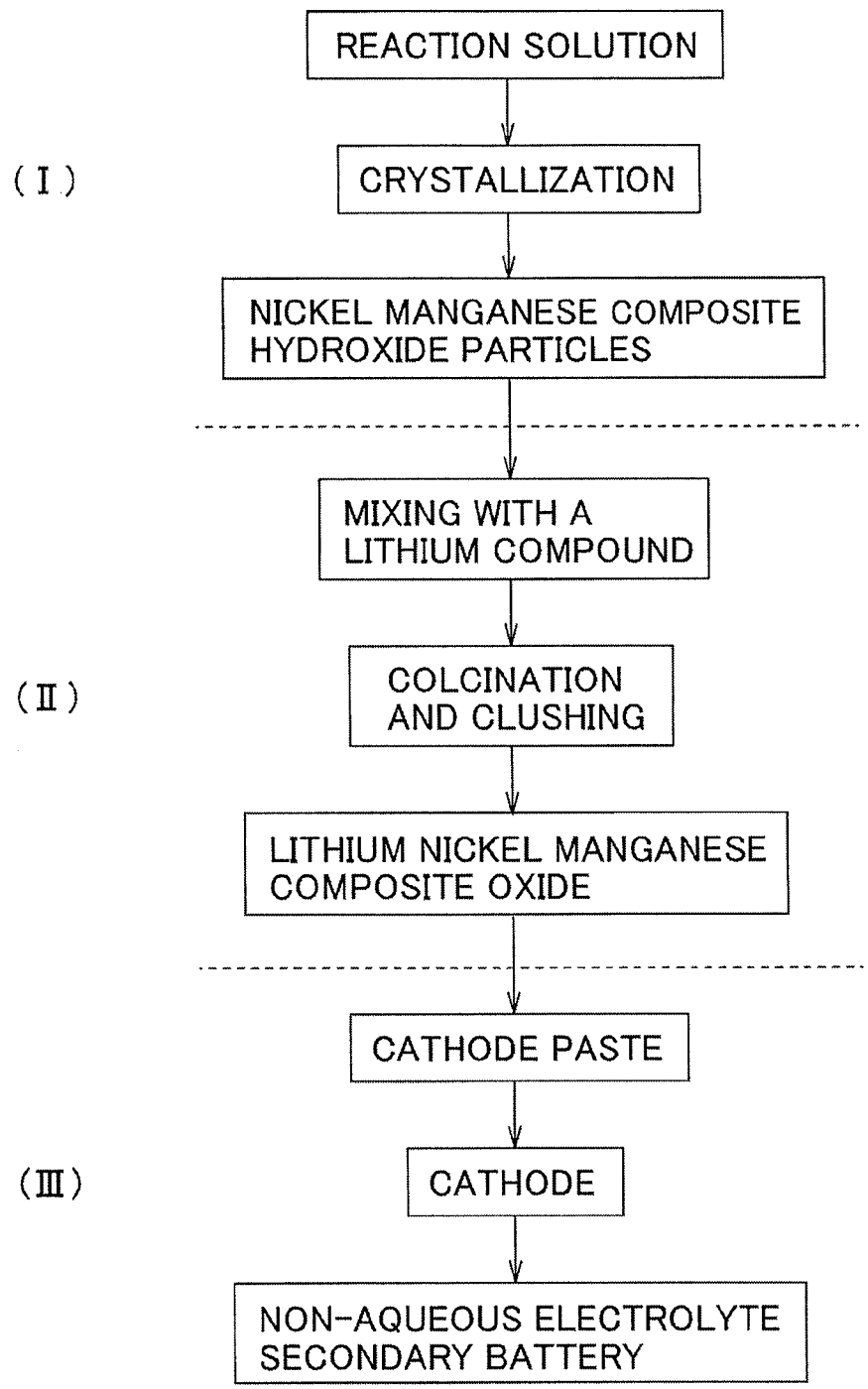
FIG. 4 is a flowchart of the flow from manufacturing the nickel manganese composite hydroxide to manufacturing a non-aqueous electrolyte secondary battery.

As illustrated in FIG. 3, the method for manufacturing cathode active material of the present invention includes: a) a step of heat treating the nickel manganese composite hydroxide particles that are the raw material for the cathode active material of the present invention obtained and obtained by the manufacturing method above; b) a mixing step for forming a mixture by mixing a lithium compound into the particles after heat treatment; and a calcination step of calcining the mixture that was formed in the mixing step. Each of the steps will be explained below.

a) Heat Treatment Step

The heat treatment step is a step for performing heat treatment that heats the nickel manganese composite hydroxide particles (hereafter, referred to as composite hydroxide particles) to a temperature of 105 to 750° C., and removes the moisture contained in the composite hydroxide particles. By performing this heat treatment step, the moisture that remains in the particles until the calcination step can be reduced to a certain amount. As a result, it is possible to prevent fluctuation in the percentage of the number of metal atoms or the number of lithium atoms in the manufactured cathode active material.

Moisture should be removed to an amount such that fluctuation in the percentage of the number of metal atoms or the number of lithium atoms in the manufactured cathode active material does not occur, so it is not absolutely necessary to convert all of the composite hydroxide particles to nickel manganese composite oxide particles (hereafter, referred to as composite oxide particles). However, in order to further reduce the fluctuation described above, preferably the heating temperature is 500° C. or greater, and all of the composite hydroxide particles are converted to composite oxide particles.

In the heat treatment step, when the heating temperature is less the 105° C., it is not possible to remove the surplus moisture in the composite hydroxide particles, and it is not possible to suppress the fluctuation above. On the other hand, when the heating temperature exceeds 750° C., the particles are sintered by the heat treatment, and it is not possible to obtain composite oxide particles having a uniform particle size. The metallic component that is included in the composite hydroxide particles is analyzed according to the heat treatment conditions and found beforehand, and by determining a ratio with the lithium compound, it is possible to suppress the fluctuation.

The atmosphere for performing heat treatment is not particularly limited, and can be a non-reducing atmosphere, however, preferably heat treatment is performed in an atmosphere wherein air flow can be performed easily.

Moreover, the heat treatment time is not particularly limited, however, when the time is less than one hour, the removal of surplus moisture in the composite hydroxide particles cannot be performed sufficiently, so preferably the time is one hour or longer, and more preferably 5 to 15 hours.

The equipment that is used in the heat treatment is not particularly limited, and as the composite hydroxide particles can be heated in a non-reducing atmosphere, and preferably in air flow, an electric furnace that does not generate gas can suitably be used.

b) Mixing Step

The mixing step is a step for obtaining a lithium mixture by mixing the composite hydroxide particles that were heat treated in the heat treatment step (hereafter, referred to as heat treated particles) with a material containing lithium, for example a lithium compound.

Here, not only the composite hydroxide particles from which residual moisture was removed in the heat treatment step, but also complex oxide particles that were converted to oxides in the heat treatment step or a mixture of these particles is contained in the heat treated particles.

The heat treated particles and the lithium compounds are mixed so that the ratio of the number of lithium atoms with respect to the number of metal atoms other than lithium in the lithium mixture, in other words, the sum of the atoms of nickel, manganese, cobalt and added elements (Me) (Li/Me) is 0.95 to 1.5, and preferably 1 to 1.5, and more preferably 1.1 to 1.35. In other words, the ratio Li/Me does not change before and after the calcination step, so the ratio Li/Me in the mixing step become the ratio Li/Me in the cathode active material, so mixing is performed so that the ratio Li/Me of the lithium compound is the same as the ratio Li/Me in the cathode active material to be obtained.

The lithium compound that is used for forming the lithium mixture is not particularly limited, however, for example, from the aspect of the ease of obtaining material, lithium hydroxide, lithium sulfate, lithium carbonate or a mixture of these is preferred. Particularly, taking into consideration the ease of handling and the stability of quality, preferably lithium hydroxide or lithium carbonate is used.

Preferably the lithium mixture is sufficiently mixed before calcination. When mixing is not sufficient, there is a possibility that problems will occur such as fluctuation in Li/Me between individual particles, and sufficient battery characteristics will not be obtained.

Furthermore, a typical mixer can be used for mixing; for example, it is possible to use a shaker mixer, V blender, ribbon mixer, Julia mixer, Loedige mixer or the like, and the composite oxide particles should be sufficiently mixed with material containing lithium to an extent that the framework of the heat treated particles is not broken down. For example, in the case of using a shaker mixer, by setting the mixing condition to be 5 to 20 minutes, it is possible to sufficiently mix the composite hydroxide particles and lithium compound.

c) Calcination Step

The calcination step is a step that caclinates the lithium mixture that was obtained in the mixing step, and forms a hexagonal crystal type layered lithium nickel manganese composite oxide. When the lithium compound is calcinated in the calcination step, the lithium in a lithium containing material is dispersed in the heat treated particles, so a lithium nickel manganese composite oxide is formed.

(Calcination Temperature)

The calcination of the lithium mixture is preferably performed at a temperature of 800 to 980° C., and more preferably 820 to 960° C.

When the calcination temperature is less than 800° C., dispersion of lithium into the heat treated particles is not performed sufficiently, and surplus lithium or unreacted particles remain, the crystal structure is not sufficiently arranged, and when used in a battery, sufficient battery characteristics are not obtained.

Moreover, when the calcination temperature exceeds 980° C., there is a possibility that together with severe sintering occurring between composite oxide particles, there will be abnormal particle growth, so there is a possibility that the particles after calcination will become coarse, and it will not be possible to maintain the particle shape (spherical particles shape to be described next). In the case of this kind of cathode active material, the specific surface area decreases, so when used in a battery, there is a problem in that the cathode resistance increases and the battery capacity decreases.

From the aspect of uniformly performing the reaction between the heat treated particles ad the lithium compound, preferably the temperature above will rise at a temperature increase rate of 3 to 50° C./min. Furthermore, by maintaining the temperature at near the melting point of the lithium compound for 1 to 5 hours, it is possible to perform a even more uniform reaction.

(Calcination Time)

Of the calcination time, the hold time, during which the temperature is maintained at a specified temperature, is preferably at least one hour, and more preferably 2 to 12 hours. When the time is less than one hour, it is possible that the formation of the lithium nickel manganese composite oxide will not be performed sufficiently. After this hold time is finished, the time is not particularly limited, however, when the lithium mixture is accumulated in a sagger and calcinated, in order to prevent deterioration of the sagger, preferably the atmosphere is cooled to 200° C. at a cooling rate of 2 to 10° C./min.

(Temporary Calcination)

Particularly, when lithium hydroxide or lithium carbonate is used as the lithium compound, temporary calcination is performed by maintaining the temperature at a temperature of 350 to 800° C., which is lower than the calcination temperature, and preferably at a temperature of 450 to 780° C. for 1 to 10 hours, and preferably 3 to 6 hours. In other words, preferably temporary calcination is performed at the reaction temperature of the lithium hydroxide or lithium carbonate and the heat treated particles. In this case, by maintaining the temperature at near the reaction temperature of the lithium hydroxide or lithium carbonate, it is possible to sufficiently perform dispersion of the lithium into the heat treated particles, and thus it is possible to obtain uniform lithium nickel manganese composite oxide.

When it is desired to increase the concentration of added element M on the surface of the lithium nickel manganese composite oxide particles, heat treated particles of the raw material, the surface of which are uniformly covered by the added element M, can be used. By calcining a lithium mixture that contains the heat treated particles under moderate conditions, it is possible to increase the concentration of the added element M on the surface of the lithium nickel manganese composite oxide particles. More specifically, by calcining a lithium mixture that contains heat treated particles covered by the added element M at a temperature lower than the calcination temperature and for a time shorter than the calcination time, it is possible to obtain lithium nickel manganese composite particles having an increased concentration of added element M on the surface of the particles. For example, when the calcination temperature is taken to be 800 to 900° C. and the calcination time is 1 to 5 hours, it is possible to increase the concentration of added element M on the surface of the particles by 1 to 10%.

On the other hand, even when a lithium mixture containing heat treated particles covers with the added element M is calcinated, when the calcination temperature is high and the calcination time is long, it is possible to obtain lithium nickel manganese composite oxide particles in which the added element is uniformly distributed inside the particles. In other words, by adjusting the heat treated particles of the raw material and the calcination conditions, it is possible to obtain lithium nickel manganese composite oxide particles having the target concentration distribution.

(Calcination Atmosphere)

The calcination atmosphere is preferably an oxidizing atmosphere, and more preferably the oxygen concentration is 18 to 100% by volume, and a mixed atmosphere of oxygen having the oxygen concentration described above and an inert gas is particularly preferred. In other words, preferably calcination is performed in atmospheric air or in an oxygen flow. When the oxygen concentration is less than 18% by volume, there is a possibility that the crystallinity of the lithium nickel manganese composite oxide will not be sufficient. Particularly, when considering the battery characteristics, performing calcination in oxygen flow is preferred.

The furnace that is used in calcination is not particularly limited, and as long as the lithium mixture can be heated in atmospheric air or in oxygen flow any kind of furnace can be used, however, from the aspect of uniformly maintaining the atmosphere inside the furnace, a furnace in which gas is not generated is preferred, it is possible to used either a batch type or continuous type of furnace.

(Cracking)

Of the lithium nickel manganese composite oxide particles obtained by calcination, aggregation or light sintering may occur. In that case, the particles must be cracked, and as a result, lithium nickel manganese oxide, or in other words, the cathode active material of the present invention can be obtained. Cracking is an operation for loosening up an aggregate wherein mechanical energy is applied to an aggregate of a plurality of secondary particles resulting from sintering necking between secondary particles during calcination in order to separate the secondary particles without breaking drown the secondary particles themselves. As the method of cracking, it is possible to use a known method such as a pin mill, hammer mill or the like, however, when performing cracking, the cracking force should preferably be adjusted so that the secondary particles are not broken down.

(3) Non-Aqueous Electrolyte Secondary Battery

The non-aqueous electrolyte secondary battery of the present invention employs a cathode that uses the cathode active material for a non-aqueous electrolyte secondary battery for the cathode. First, the construction of the non-aqueous electrolyte secondary battery of the present invention will be explained.

Except for using cathode active material of the present invention, the construction of the non-aqueous electrolyte secondary battery of the present invention essentially comprises the same construction as a typical non-aqueous electrolyte secondary battery.

More specifically, the secondary battery of the present invention comprises a case, a cathode and anode that are housed in the case, a non-aqueous electrolyte and a separator. Even more specifically, an electrode unit that is obtained by layering a cathode and electrode with a separator in between is impregnated with a non-aqueous electrolyte, and collector leads are used to connect between the cathode current collector of the cathode and the cathode terminal that leads to the outside, and between the anode current collector of the anode and the anode terminal that leads to the outs, and these are sealed in the case to form the secondary battery of the present invention.

The construction of the secondary battery of the present invention, needless to say, is not limited to the example above, and various shapes can be used for the external shape such as a can shape, layered shape or the like.

(Cathode)

First, the cathode, which is the feature of the secondary battery of the present invention, is explained. The cathode is a sheet shaped member, and is formed, for example, by coating and drying a blended cathode material paste that contains the cathode active material of the present invention on the surface of an aluminum foil collector.

The cathode is appropriately process to correspond to the type of battery used. For example, processing such as a cutting process to form a suitable size for the battery, a compression process such as roll pressing or the like to increase the electrode density and the like is performed.

The blended cathode material paste is formed by adding a solvent to the blended cathode material and mixing them. The blended cathode material is formed by mixing the powder cathode active material of the present invention with a conductive material and a binding agent.

The conductive material is added for giving suitable conductivity to the electrode. This conductive material is not particularly limited, for example, a carbon black material such as graphite (natural graphite, man-made graphite, expanded graphite), acetylene black, Ketchen black and the like can be used.

The binding agent serves the role of binding cathode active materials. The binding agent that is used in this blended cathode material is not particularly limited, however, it is possible to use, for example, polyvinylidene fluoride (PVDF), polytetrafluoroethylene (PTFE), fluororubber, ethylene-propylene-diene rubber, styrene-butdiene, cellulose resin, polyacrylic acid or the like.

It is also possible to add activated carbon to the blended cathode material, and by added activated carbon, it is possible to increase the electric double layer capacitance of the cathode.

The solvent dissolves the bonding agent, and causes the cathode active material, conductive material and activated carbon to be dispersed into the bonding agent. This solvent is not particularly limited, however, it is possible use an organic solvent such as N-methyl-2-pyrrolidone for example.

The mixture ratio of the material inside the blended cathode material paste is not particularly limited. For example, when the solid content of the blended cathode material without the solvent is taken to be 100 parts by weight, then as in the case of a cathode in a typical non-aqueous electrolyte secondary battery, the content of the cathode active material can be 60 to 95 parts by weight, the content of the conductive material can be 1 to 20 parts by weight, and the content of the binding agent can be 1 to 20 parts by weight.

(Anode)

The anode is a sheet shaped member that is formed by coating and drying blended anode material paste on the surface of a metal foil collector made of metal such as copper. This anode is formed essentially by the same method as the cathode, however the components of the blended anode material paste, the composition of those components, and the material of the collector differ, and as in the case of the cathode, various processing is performed as necessary.

The blended anode material paste is formed by adding a suitable solvent to the blended anode material, which is a mixture of anode active material and a binding agent, to obtain a paste.

The anode active material, for example, can be a material containing lithium such as metallic lithium or lithium alloy, or can be an absorbing material that is capable of absorption and desorption of lithium ions.

The absorbing material is not particularly limited, and it is possible to use natural graphite, man-made graphite, an organic compound fired material such as phenol resin and the like, or a powder like carbon material such as coke. When this absorbing material is used for the anode active material, as in the case of the cathode, it is possible to use a fluorine-containing resin such as PVDF as the binding agent, and it is possible to use an organic solvent such as N-methyl-2-pyrrolidone as the solvent that disperses the anode active material into the binding agent.

(Separator)

The separator is located between the cathode and the anode, and functions to separate the cathode and anode and to hold the electrolyte. The separator is made from a thin polyethylene or polypropylene film, for example, it is possible to use a film having a plurality of fine holes, however, as long as the separator has the functions described above, it is not particularly limited.

(Non-Aqueous Electrolyte)

The non-aqueous electrolyte is formed by dissolving a lithium salt, which is the supporting electrolyte salt, in an organic solvent.

The organic solvent can be selected from one kind or a mixture of two or more kinds of a cyclic carbonate such as ethylene carbonate, propylene carbonate, butylene carbonate, trifluoroacetic propylene carbonate or the like; a chain carbonate such as diethyl carbonate, dimethyl carbonate, ethyl methyl carbonate, dipropyl carbonate and the like, an ether compound such as tetrahydrofuran, 2-methyltetrahydrofuran, dimethoxyethane and the like; a sulfur compound such as ethyl methyl sulfone, butane sultone and the like; or a phosphorus compound such as triethyl phosphate, trioctyl phosphate and the like.

As the supporting electrolyte salt, it is possible to use a salt such as $LiPF_6$, $LiBF_4$, $LiClO_4$, $LiAsF_6$, $LiN(CF_3SO_2)_2$ or a combination of these.

In order to improve the battery characteristics, the non-aqueous electrolyte can also include a radical scavenger, a surfactant, a flame retardant and the like.

(Characteristics of the Non-Aqueous Electrolyte Secondary Battery of the Present Invention)

The non-aqueous electrolyte secondary battery of the present invention is constructed as described above, and has a cathode that uses the cathode active material of the present invention, so a high initial discharge capacity of 150 mAh/g or greater, and preferably 155 mAh/g, and a low cathode resistance of 10Ω or less, and preferably 9Ω or less are obtained, so the battery is a high capacity and high output battery. Moreover, the ability to maintain a 200 cycle capacity is 80% or greater, and preferably 85% or greater, so has excellent cyclability, and when compared with conventional lithium, can be said to have high thermal stability and good safety characteristics.

(Uses of the Secondary Battery of the Present Invention)

The secondary battery of the present invention has the above characteristics, so it is suitable for use as a power source for a compact portable device that requires constant high capacity (such as a notebook personal computer, mobile telephone or the like).

Moreover, the secondary battery of the present invention is also suitable for use as battery as the power source for driving a motor that requires high output. As a battery becomes large, it becomes difficult to maintain safety, and expensive protective circuits are essential, however, the secondary battery of the present invention has excellent safety, so not only is it easy to maintain safety, it is possible to simplify expensive protective circuits, and further lower the cost. The battery can be made to be compact and have high output, so is suitable as a power source for conveying equipment that is restricted by installation space.

EXAMPLES

Example 1

Manufacturing of the Composite Hydroxide Particles

The composite hydroxide particles were manufactured as described below. For all samples, the composite hydroxide particles, cathode active material and secondary battery were manufactured using high grade specimens manufactured by Wako Pure Chemical Industries, Ltd.
(Nucleation Step)

First, 7 liters of water is put into the reaction tank (34 L) and while stirring, the temperature inside the tank is set to 70° C., and nitrogen gas is caused to be circulated for 30 minutes, and the oxygen concentration in the space inside the reaction tank is kept at 1% or less. An appropriate amount of 25% by volume sodium hydroxide aqueous solution is added to the water in the reaction tank, and the pH value of the aqueous solution in the reaction tank before reaction is adjusted to a value of 13.1 at a standard solution temperature of 25° C.

Next, nickel sulfate and manganese sulfate is dissolved in the water to prepare a ⅛ mol/L mixed solution. The mixed solution is adjusted so that the elemental mole ratio of each metal is Ni:Mn=50:50.

This mixed solution is added at a rate of 88 ml/min to the aqueous solution in the reaction tank before reaction to form a reaction solution. At the same time, 25% by volume sodium hydroxide aqueous solution is also added at a constant rate to the reaction solution, and while circulating nitrogen gas though the reaction solution, and while performing control to keep the pH value of the reaction solution (aqueous solution for nucleation) at a value of 13.1 (nucleation pH value), nucleation was performed by allowing crystallization for 2 minutes 30 seconds. The range of fluctuation of the pH value was ±0.2. Moreover, the temperature inside the tank was maintained at 60° C. or greater.
(Particle Growth Step)

After nucleation ended, the temperature inside the tank was maintained at 60° C. or greater, and sulfuric acid was added until the pH value of the reaction solution reached a value of 10.6 at a standard solution temperature of 25° C. After the pH value of the reaction solution reached 10.6, the mixed solution and the 25% by volume sodium hydroxide aqueous solution were one again supplied to the reaction solution (aqueous solution for particle growth), and while performing control to keep that pH value at 10.6 at a standard solution temperature of 25° C., crystallization was performed for 4 hours. The grown material was then washed, filtered and dried to obtain composite hydroxide particles.

During the crystallization above, the pH was controlled using a pH controller to adjust the supply flow rate of sodium hydroxide aqueous solution, and the range of fluctuation was within the range of ±0.2 of the set value.
[Analysis of the Composite Hydroxide]

For the obtained composite hydroxide, after a sample was dissolved in an inorganic acid, chemical analysis was performed by using ICP-Atomic Emission Spectrometry, and the composition was found to be $Ni_{0.5}Mn_{0.5}(OH)_{2+a}$ ($0 \leq a \leq 0.5$).

Moreover, for this composite hydroxide, the value [(d90−d10)/average particle size] that indicates the average particle size and particles size distribution is calculated and found from the volume integrated value that was measured using a laser diffraction scattering particle size distribution measurement device (Microtrac HRA, manufactured by Nikkiso Co., Ltd.). As a result, the average particle size was found to be 3.9 μm, and the value [(d90−d10)/average particle size] was 0.49.

Next, SEM (scanning electron microscope S-4700, manufactured by Hitachi High-Technologies Corporation) observation (magnification rate: 1000×) of the obtained composite hydroxide particles was performed, and it was confirmed that the composite hydroxide particles were spherical, and the particle size was nearly uniform. The SEM observation results are illustrated in FIG. 5.

Figure 6:
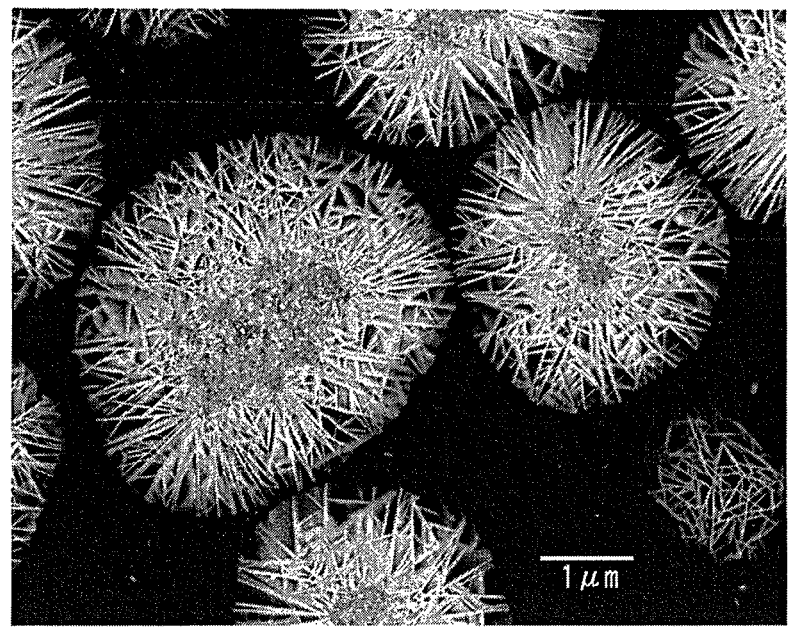
FIG. 6 is an SEM photograph of a cross section of the nickel manganese composite hydroxide of the present invention (10,000× magnification rate).

A sample of the obtained composite hydroxide particles is embedded in resin, and after performing a cross-section polishing process, SEM observation was performed at a magnification rate of 10,000×, and as a result it was found that the composite hydroxide particles comprises secondary particles, and those secondary particles were spherical in shape with a center section having fine primary particles with a particle size of 0.05 μm, and an outer shell section having plate shaped or needle shaped primary particles having a particle size of 0.8 μm were observed, with the thickness of the outer shell section being 1.2 μm. The results of the SEM observation of this cross section are illustrated in FIG. 6. The thickness of the outer shell section with respect to the diameter of the secondary particles was found to be 30.8% from the SEM observation of this cross section.
[Manufacturing the Cathode Active Material]

The composite hydroxide particles were heat treated in air (oxygen: 21% by volume) at a temperature of 700° C. for 6 hours, converted to composite oxide particles and recovered.

Lithium hydroxide was weighed so that Li/Me=1.35, and then mixed with the composite oxide particles above to prepare a lithium mixture. Mixing was performed using a shaker mixer (TURBULA Type T2C, manufactured by Willy A. Bachofen (WAB)).

The obtained lithium mixture was temporarily calcinated in air (oxygen: 21% by volume) at a temperature of 500° C. for 4 hours, then calcinated at 900° C. for 4 hours, cooled, and then crushed to obtain the cathode active material.
[Analysis of the Cathode Active Material]

Using the same method as for the composite hydroxide particles, the particle size distribution of the obtained cathode active material was measured, and the average particle size was 4.3 μm, and the value [(d90−d10)/average particle size] was 0.55.

Using the same method as for the composite hydroxide particles, the SEM observation and cross-section SEM observation of the cathode active material were performed, and it was confirmed that the obtained cathode active material was spherical and the particle size was mostly uniform. The results of the SEM observation of this cathode active material is illustrated in FIG. 7. On the other hand, it was also confirmed from the cross-section SEM observation that this cathode active material has hollow construction comprising an outer shell section of sintered primary particles, and a hollow section inside the shell section. The thickness of the outer shell section was 0.66 μm. The results of the cross-section SEM observation of this cathode active material are illustrated in FIG. 8. The ratio of the thickness of the outer shell section with respect to the particle size of the cathode active material was 15.3%.

The specific surface area of the obtained cathode active material was found using a flow type gas adsorption specific surface area measurement device (Multisorb, manufactured by Yuasa-Ionics) to be 1.5 $m^2/g$.

Moreover, analysis by Cu—Kα line powder X-ray diffraction was performed for the obtained cathode active material using an X-ray diffractometer (X'Pert PRO, manufactured by PANalytical), and the crystal structure of the cathode active material was confirmed to comprise a single-phase hexagonal crystal lithium nickel manganese composite oxide.

Furthermore, similarly, using the ICP-Atomic Emission Spectrometry method, the composition of the cathode active material was analyzed, and confirmed to be $Li_{1.36}Ni_{0.50}Mn_{0.50}O_2$ with a composition of Li at 9.55% by weight, Ni at 29.7% by weight and Mn at 27.8% by weight.

[Manufacturing the Secondary Battery]

Figure 9:
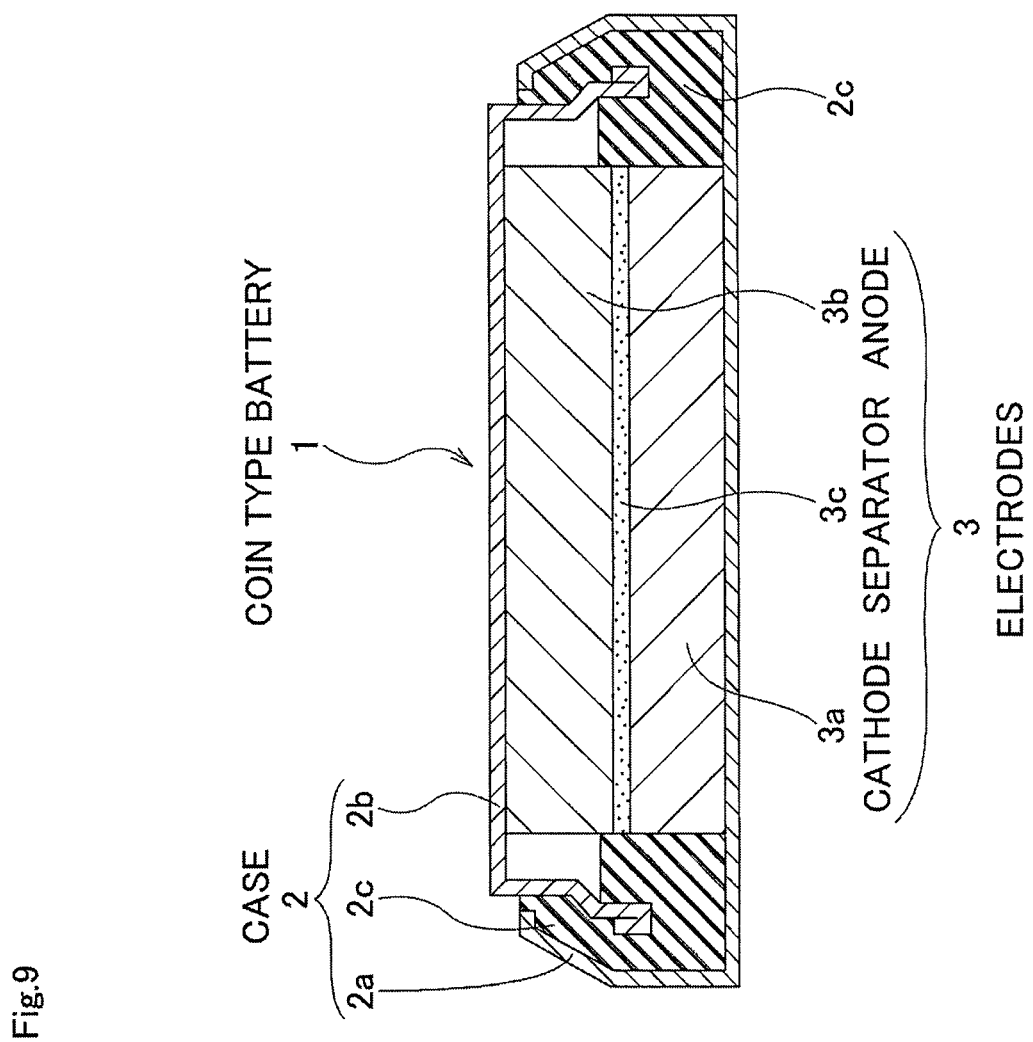
FIG. 9 is a cross-sectional view of a coin-type battery that was used for battery evaluation.

For evaluation of the obtained cathode active material, the cathode active material was used in 2032 type coin battery. As illustrated in FIG. 9, this coin type battery 1 comprises a case 2, and electrodes 3 that are housed inside the case 2.

The case 2 has a cathode can 2a that is hollow and opened on one end, and an anode can 2b that is placed at the opening section of the cathode can 2a, and when this anode can 2b is placed at the opening section of the cathode can 2a, a space is formed that houses electrodes 3 between the anode can 2 and cathode can 2a.

The electrodes 3 comprise a cathode 3a, separator 3c and anode 3b, which are layered in this order, and are housed in the case 2 such that the cathode 3a comes in contact with the inner surface of the cathode can 2a, and the anode 3b comes in contact with the inner surface of the anode can 2b.

The case 2 comprises a gasket 2c, and this gasket 2c fastens the cathode can 2a and anode can 2b so that an electrically insulated state is maintained between the cathode can 2a and anode can 2b. Moreover, the gasket 2c also has the function of sealing off the space between the cathode can 2a and anode can 2b and closing off the space between the inside of the case 2 and the outside so that the space is airtight and fluid tight.

This coin type battery 1 is manufactured as described below. First, 52.5 mg of the obtained cathode active material, 15 mg of acetylene black, and 7.5 mg of polytetrafluoroethylene resin (PTFE) are mixed, and then the cathode 3a is manufactured by pressing the mixture with a pressure of 100 MPa, to a diameter of 11 m and length of 100 µm. The manufactured cathode 3a is dried in a vacuum drier at 120° C. for 12 hours. Using this cathode 3a, an anode 3b, a separator 3c and electrolyte, the coin type battery 1 is manufactured inside a glove box having an Ar atmosphere having a dew point controlled at −80° C.

An anode sheet that is formed by coating copper foil with graphite powder having an average particle size of 20 µm and polyvinylidene fluoride and that is punched into a disk shape having a diameter of 14 mm is used as the anode 3b. A porous polyethylene film having a film thickness of 25 µm is used as the separator 3c. A mixed solution (manufactured by Tomiyama Pure Chemical Industries, Ltd.) of equal amounts of ethylene carbonate (EC) and diethyl carbonate (DEC) with 1M of $LiClO_4$ as the supporting electrolyte is used as the electrolyte.

[Battery Evaluation]

The initial discharge capacity, the cycle capacity retention rate and the cathode resistance, which are used to evaluate the performance of the obtained coin type battery, are defined in the following.

The initial discharge capacity is the capacity after the coin type battery 1 is allowed to sit for 24 hours after being manufactured and the open circuit voltage (OCV) has become stable, is charged to a cutoff voltage of 4.8 V with the current density with respect to the cathode being 0.1 mA/cm², then after stopping for one hour, is discharged to a cutoff voltage of 2.5 V.

The cycle capacity retention rate is the calculated ratio of the discharge capacity after the charging/discharging cycle of charging to 4.5 V and discharging to 3.0 V has been performed 200 times, with the current density with respect to the cathode being 2 mA/cm², and the initial discharge capacity. Measurement of the charge and discharge capacity is performed using a multi-channel voltage/current generator (R6741A, manufactured by Advantest Corporation).

Figure 10:
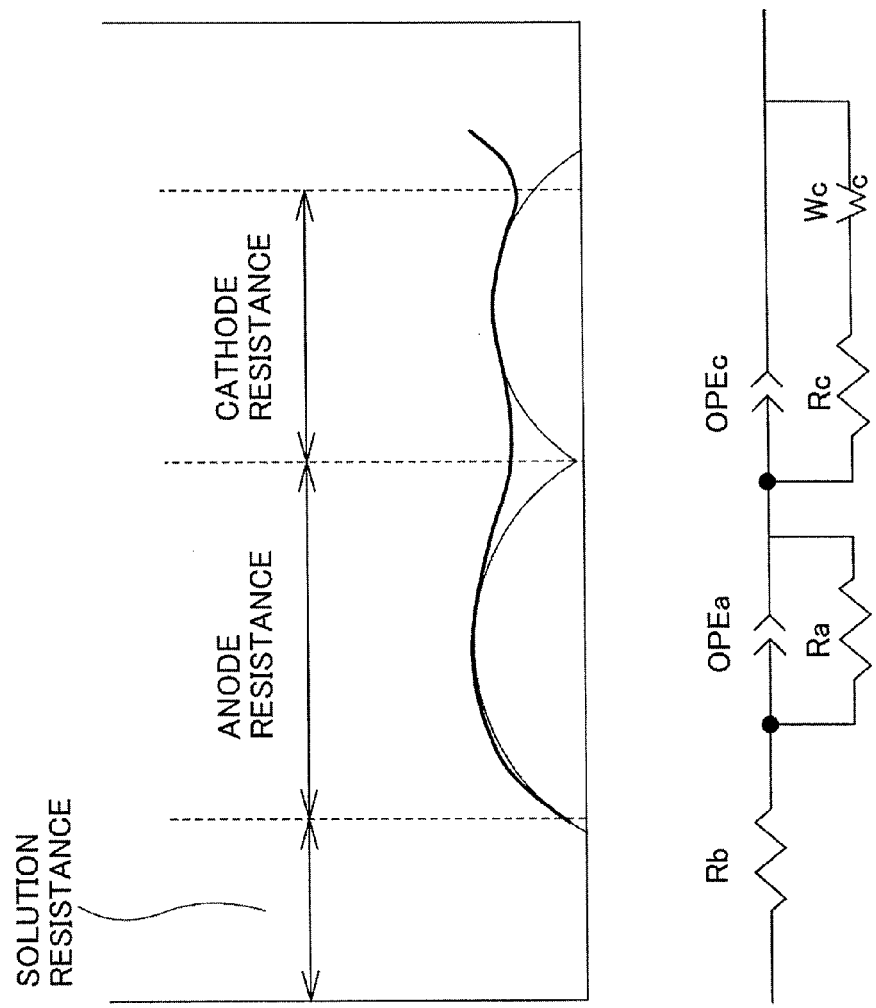
FIG. 10 is a drawing for explaining the evaluation circuit that was used for measurement and analysis in impedance evaluation.

The cathode resistance is evaluated as described below. The coin type battery 1 is charged to a potential of 4.1 V, an then using a frequency response analyzer and a potentio/galvanostat (1255B, manufactured by Solartron), the cathode resistance is measured by the alternating current impedance method, and a Nyquist plot as illustrated in FIG. 10 is obtained. This Nyquist plot is represented as a sum of characteristic curves that indicated the solution resistance, anode resistance and capacity, and cathode resistance and capacity, so the value of the cathode resistance was calculated by performing a fitting calculation using an equivalent circuit based on this Nyquist plot.

In performing battery evaluation of the coin type battery having a cathode that was formed using the cathode active material above the initial charge capacity was 206.5 mA/g, and the cathode resistance was 8.3Ω. The capacity retention rate was 86% after 200 cycles.

The characteristics of the composite hydroxide obtained in this example is illustrated in Table 1, and the characteristics of the cathode active material and the evaluations of a coin type battery that uses this cathode active material are illustrated in Table 2. The same contents for examples 2 to 4 and comparative examples 1 to 3 below are also illustrated in Table 1 and Table 2.

Example 2

Except for mixing lithium hydroxide and composite oxide particles were mixed so that Li/Me=1.25, and using a calcination temperature of 850° C., cathode active material for a non-aqueous electrolyte secondary battery was obtained in the same way as in Example 1.

The average particle size of the cathode active material was 4.8 µm, the value [(d90−d10)/average particle size] was 0.52 and the specific surface area was 1.6 m²/g. Moreover, it was confirmed from SEM observation that the cathode active material was spherical and the particle size was mostly uniform, and comprised a outer shell section of sintered primary particles and a hollow section on the inside thereof. From this observation it was found that the thickness of the outer shell section of the cathode active material was 0.58 µm, and the ratio of the thickness of the outer shell section with respect to the particle size was 14.1%. Furthermore, it was confirmed that the crystal structure of the cathode active material was single-phase hexagonal layered crystalline lithium nickel manganese composite oxide, with the composition of the cathode active material being expressed as $Li_{1.25}Ni_{0.50}M_{0.50}O_2$, where Li is 8.84% by weight, Ni is 29.9% by weight and Mn is 28.0% by weight.

The same battery evaluation as in Example 1 was performed for a coin type battery having a cathode that is formed using the cathode active material above, and it was found that the initial discharge capacity was 202.3 mAh/g, and the cathode resistance was 8.9Ω. Moreover, the capacity retention rate after 200 cycles was 85%.

Example 3

Except for using a 1.8 mol/L mixed solution that was obtained by setting the temperature in the reaction tank to 65° C., adjusting the pH value of the reaction solution to 12.8 at a standard solution temperature of 25° C., dissolving nickel sulfate, cobalt sulfate, manganese sulfate and zirconium sulfate in water so that the molar ratio of the metal elements was Ni:Co:Mn:Zr=33.2:33.1:33.3:0.5 and controlling the pH value of the reaction solution during the nucleation step to a value of 12.8, the composite hydroxide particles were obtained in the same way as in Example 1.

The composition of the composite hydroxide particles is expressed as $Ni_{0.332}Co_{0.331}Mn_{0.332}Zr_{0.005}(OH)_{2+a}$ ($0 \leq a \leq 0.5$), the average particle size was 3.8 μm, and the value [(d90−d10)/average particle size] was 0.41. From SEM observation it was confirmed that the composite hydroxide particles were spherical and had mostly a uniform particle size. Furthermore, it was observed that the composite hydroxide particles comprised secondary particles, and that the secondary particles were spherical with a center section of primary particles having a particle size of 0.04 μm and an outer shell section of plate shaped or needle shaped primary particles having a particle size of 0.9 μm; the thickness of the outer shell section being 0.95 μm and the ratio of the thickness of the outer shell section with respect to the particle size being 25%.

Next, except for heat treating the obtained composite hydroxide for 12 hours at 150° C., then using lithium carbonate as a lithium compound to obtain a lithium mixture with Li/Me=1.15, and temporarily calcining the obtained lithium mixture in air for 4 hours at 760° C., and performing calcination for 10 hours at 950° C., cathode active material was obtained in the same way as in Example 1.

The average particle size of the cathode active material was 4.0 μm, the value [(d90−d10)/average particle size] was 0.47, and the specific surface area was 1.3 m$^2$/g. From SEM observation it was confirmed that the cathode active material was spherical, had mostly a uniform particle size and had hollow structure with an outer shell section comprising sintered primary particles, and a hollow section inside thereof. From this observation it was found that the thickness of the outer shell section was 0.92 μm and the ratio of the thickness of the outer shell section with respect to the particle size was 23%. Furthermore, it was confirmed that the crystal structure of this cathode active material was single-phase hexagonal layered crystalline lithium nickel manganese composite oxide, and that the composition of the cathode active material was represented as $Li_{1.15}Ni_{0.332}Co_{0.331}Mn_{0.332}Zr_{0.005}O_2$, where Li was 7.93% by weight, Ni was 19.2% by weight, Co was 19.3% by weight, Mn was 18.0% by weight and Zr was 0.45% by weight.

When evaluating a coin type battery that has a cathode that was formed using the cathode active material above, except that the cutoff voltage is made to be 3.0 to 4.3 V, evaluation was performed in the same way as in Example 1, and it was found that the initial discharge capacity was 158.2 mAh/g, and the cathode resistance was 3.2Ω. Moreover, the capacity retention rate after 200 cycles was 91%.

Example 4

Except for simultaneously and continuously adding an aqueous solution of sodium tungstate during the crystallization reaction, the composite hydroxide particles were obtained in the same as in Example 3.

The composition of the composite hydroxide particles is expressed as $Ni_{0.33}Co_{0.33}Mn_{0.33}Zr_{0.005}W_{0.005}(OH)_{2+a}$ ($0 \leq a \leq 0.5$), the average particle size was 4.0 μm, and the value [(d90−d10)/average particle size] was 0.44. From SEM observation, it was confirmed that the composite hydroxide particles were spherical and mostly had uniform particle size. Furthermore, it was observed that the composite hydroxide particles comprised secondary particles, and that the secondary particles were spherical with a center section having primary particles with a particle size of 0.03 μm and an outer shell section having plate shape or needle shaped primary particles with a particle size of 0.8 μm; the thickness of the outer shell section being 1.0 μm and the ratio of the thickness of the outer shell section with respect to the particle size being 25%.

After that, cathode active material was obtained from the composite hydroxide particles in the same way as in Example 3. The average particle size of the cathode active material was 4.3 μm, the value [(d90−d10)/average particle size] was 0.49, and the specific surface area was 1.4 m$^2$/g. From SEM observation it was confirmed that the cathode active material was spherical, had mostly a uniform particle size and had hollow structure with an outer shell section comprising sintered primary particles, and a hollow section inside thereof. From this observation it was found that the thickness of the outer shell section was 0.95 μm and the ratio of the thickness of the outer shell section with respect to the particle size was 22%. Furthermore, it was confirmed that the crystal structure of this cathode active material was single-phase hexagonal layered crystalline lithium nickel manganese composite oxide, and that the composition of the cathode active material was represented as $Li_{1.15}Ni_{0.33}Co_{0.33}Mn_{0.33}W_{0.005}Zr_{0.005}O_2$, where Li was 8.07% by weight, Ni was 19.6% by weight, Co was 19.7% by weight, Mn was 18.3% by weight, Zr was 0.46% by weight and W was 0.93% by weight.

A coin type battery that has a cathode that was formed using the cathode active material above was evaluated in the same way as in Example 3, and it was found that the initial discharge capacity was 157.4 mAh/g, and the cathode resistance was 3.1Ω. Moreover, the capacity retention rate after 200 cycles was 92%.

Example 5

Except for using a 1.8 mol/L mixed solution obtained by dissolving nickel sulfate, cobalt sulfate, manganese sulfate and zirconium sulfate in water so that the molar ratio of each metal element was Ni:Co:Mn:Zr=33.2:33.1:33.2:0.5, and simultaneously and continuously adding an aqueous solution of sodium tungstate during the crystallization reaction, the composite hydroxide particles were obtained in the same as in Example 1.

The composition of the composite hydroxide particles is expressed as $Ni_{0.33}Co_{0.33}Mn_{0.33}Zr_{0.005}W_{0.005}(OH)_{2+a}$ ($0 \leq a \leq 0.5$), the average particle size was 3.8 μm, and the value [(d90−d10)/average particle size] was 0.42. From SEM observation, it was confirmed that the composite hydroxide particles were spherical and mostly had uniform particle size. Furthermore, it was observed that the composite hydroxide particles comprised secondary particles, and that the secondary particles were spherical with a center section having primary particles with a particle size of 0.03 μm and an outer shell section having plate shape or needle shaped primary particles with a particle size of 0.8 μm; the thickness of the outer shell section being 1.0 μm and the ratio of the thickness of the outer shell section with respect to the particle size being 26.3%.

Next, except for heat treating the obtained composite hydroxide for 12 hours at 150° C., then using lithium carbonate as a lithium compound to obtain a lithium mixture with Li/Me=1.15, and temporarily calcining the obtained lithium mixture in air for 4 hours at 760° C., and performing calcination for 10 hours at 950° C., cathode active material was obtained in the same way as in Example 1.

The average particle size of the cathode active material was 4.1 μm, the value [(d90−d10)/average particle size] was 0.48, and the specific surface area was 1.3 m$^2$/g. From SEM observation it was confirmed that the cathode active material was spherical, had mostly a uniform particle size and had hollow structure with an outer shell section comprising sintered primary particles, and a hollow section inside thereof. From this observation it was found that the thickness of the outer shell section was 0.94 μm and the ratio of the thickness of the outer shell section with respect to the particle size was 23%. Furthermore, it was confirmed that the crystal structure of this cathode active material was single-phase hexagonal layered crystalline lithium nickel manganese composite oxide, and that the composition of the cathode active material was represented as $Li_{1.15}Ni_{0.33}Co_{0.33}Mn_{0.33}Zr_{0.005}W_{0.005}O_2$, where Li was 8.07% by weight, Ni was 19.6% by weight, Co was 19.7% by weight, Mn was 18.3% by weight, Zr was 0.46% by weight and W was 0.93% by weight.

When evaluating a coin type battery that has a cathode that was formed using the cathode active material above, except that the cutoff voltage is made to be 3.0 to 4.3 V, evaluation was performed in the same way as in Example 1, and it was found that the initial discharge capacity was 158.2 mAh/g, and the cathode resistance was 3.2Ω. Moreover, the capacity retention rate after 200 cycles was 92%.

Example 6

Except for adding the aqueous solution for nucleation after the nucleation step to a component adjustment solution that was prepared separately from the aqueous solution of nucleation to form a reaction solution and performing the particle growth step with this reaction solution as the particle growth aqueous solution, the composite hydroxide particles were obtained in the same way as in Example 1. The component adjustment solution was adjusted to a pH value of 10.6 by mixing a 1.8 mol/L mixed solution that was obtained by dissolving nickel sulfate and manganese sulfate in water with a 25% by weight sodium hydroxide aqueous solution.

The composition of the composite hydroxide particles is expressed as $Ni_{0.50}Mn_{0.50}(OH)_{2+a}$ (0≤a≤0.5), the average particle size was 4.1 μm, and the value [(d90−d10)/average particle size] was 0.50. From SEM observation, it was confirmed that the composite hydroxide particles were spherical and mostly had uniform particle size. Furthermore, it was observed that the composite hydroxide particles comprised secondary particles, and that the secondary particles were spherical with a center section having primary particles with a particle size of 0.04 μm and an outer shell section having plate shape or needle shaped primary particles with a particle size of 0.9 μm; the thickness of the outer shell section being 1.1 μm and the ratio of the thickness of the outer shell section with respect to the particle size being 26.8%.

After that the cathode active material was obtained in the same way as in Example 1. The average particle size of the cathode active material was 4.3 μm, the value [(d90−d10)/average particle size] was 0.53, and the specific surface area was 1.2 m$^2$/g. From SEM observation it was confirmed that the cathode active material was spherical, had mostly a uniform particle size and had hollow structure with an outer shell section comprising sintered primary particles, and a hollow section inside thereof. From this observation it was found that the thickness of the outer shell section was 1.1 μm and the ratio of the thickness of the outer shell section with respect to the particle size was 25.6%. Furthermore, it was confirmed that the crystal structure of this cathode active material was single-phase hexagonal layered crystalline lithium nickel manganese composite oxide, and that the composition of the cathode active material was represented as $Li_{1.36}Ni_{0.50}Mn_{0.50}O_2$, where Li was 9.53% by weight, Ni was 29.6% by weight, and Mn was 27.7% by weight.

When evaluating a coin type battery that has a cathode that was formed using the cathode active material above in the same way as in Example 1, it was found that the initial discharge capacity was 203.3 mAh/g, and the cathode resistance was 8.6Ω. Moreover, the capacity retention rate after 200 cycles was 85%.

Example 7

Except for stopping the supply and mixing of the mixed solution and sodium hydroxide aqueous solution once to allow the nuclei and composite hydroxide to precipitate out and drain the supernatant liquid from the particle growth aqueous solution during the particle growth process, the complex hydroxide particles are obtained in the same way as in Example 1.

The composition of the composite hydroxide particles is expressed as $Ni_{0.50}Mn_{0.50}(OH)_{2+a}$ (0≤a≤0.5), the average particle size was 3.9 and the value [(d90−d10)/average particle size] was 0.48. From SEM observation, it was confirmed that the composite hydroxide particles were spherical and mostly had uniform particle size. Furthermore, it was observed that the composite hydroxide particles comprised secondary particles, and that the secondary particles were spherical with a center section having primary particles with a particle size of 0.05 μm and an outer shell section having plate shape or needle shaped primary particles with a particle size of 0.9 μm; the thickness of the outer shell section being 1.3 μm and the ratio of the thickness of the outer shell section with respect to the particle size being 33.3%.

After that the cathode active material was obtained in the same way as in Example 1. The average particle size of the cathode active material was 4.3 the value [(d90−d10)/average particle size] was 0.54, and the specific surface area was 1.4 m$^2$/g. From SEM observation it was confirmed that the cathode active material was spherical, had mostly a uniform particle size and had hollow structure with an outer shell section comprising sintered primary particles, and a hollow section inside thereof. From this observation it was found that the thickness of the outer shell section was 0.7 μm and the ratio of the thickness of the outer shell section with respect to the particle size was 16%. Furthermore, it was confirmed that the crystal structure of this cathode active material was single-phase hexagonal layered crystalline lithium nickel manganese composite oxide, and that the composition of the cathode active material was represented as $Li_{1.36}Ni_{0.50}Mn_{0.50}O_2$, where Li was 9.55% by weight, Ni was 29.7% by weight, and Mn was 27.8% by weight.

When evaluating a coin type battery that has a cathode that was formed using the cathode active material above in the same way as in Example 1, it was found that the initial discharge capacity was 204.5 mAh/g, and the cathode resistance was 8.4Ω. Moreover, the capacity retention rate after 200 cycles was 85%.

Comparative Example 1

Using a reaction tank for continuous crystallization comprising an overflow pipe at the top, in atmospheric air, crystallization was performed by a typical method wherein a mixed solution that is the same as in Example 1, a 10 g/L ammonia aqueous solution, and 25% by weight sodium hydroxide aqueous solution are continuously added at a constant flow rate while keeping the pH value of the reaction solution constant at 11.0 at a standard solution temperature of 25° C., and the overflowing slurry is continuously recovered. The temperature inside the tank was maintained as 40° C. Except for setting the average amount of time inside the reaction tank for 10 hours, recovering the slurry, separating the solids and liquid, and obtaining crystallized matter after the inside of the tank reached a continuous state of equilibrium, cathode active material for a non-aqueous electrolyte secondary battery was obtained and evaluated in the same way as in Example 1.

The composition of the composite hydroxide particles is expressed as $Ni_{0.50}Mn_{0.50}(OH)_{2+a}$ (0≤a≤0.5), the average particle size was 10.2 μm, and the value [(d90−d10)/average particle size] was 0.70. From SEM observation, it was confirmed that overall the composite hydroxide particles were primary particles that were the same as those of the outer shell section of Example 1.

The average particle size of the cathode active material was 10.5 μm, the value [(d90−d10)/average particle size] was 0.73, and the specific surface area was 1.4 $m^2/g$. From SEM observation it was confirmed that the cathode active material was spherical, had mostly a uniform particle size and were particles having a dense solid structure. Furthermore, it was confirmed that the crystal structure of this cathode active material was single-phase hexagonal layered crystalline lithium nickel manganese composite oxide, and that the composition of the cathode active material was represented as $Li_{1.36}Ni_{0.50}Mn_{0.50}O_2$, where Li was 9.55% by weight, Ni was 29.7% by weight, and Mn was 27.8% by weight.

Evaluation of a battery that was the same as that of Example 1 was performed, and it was found that the initial discharge capacity was 208.2 mAh/g, and the cathode resistance was 30.5Ω. Moreover, the capacity retention rate after 200 cycles was 78%.

Comparative Example 2

Except for adding 25% by weight ammonia water during the crystallization reaction so that the ammonia concentration in the solution becomes 15 g/L, keeping the temperature inside the tank at 40° C., making the pH during nucleation 12.8, and the pH during particle growth 11.6, cathode active material for a non-aqueous electrolyte secondary battery was obtained and evaluated in the same way as in Example 3.

The composition of the composite hydroxide particles is expressed as $Ni_{0.332}Co_{0.331}Mn_{0.332}Zr_{0.005}(OH)_{2+a}$ (0≤a≤0.5), the average particle size was 4.2 and the value [(d90−d10)/average particle size] was 0.43. From SEM observation, it was confirmed that overall the composite hydroxide particles were primary particles that were the same as those of the outer shell section of Example 1.

The average particle size of the cathode active material was 4.4 μm, the value [(d90−d10)/average particle size] was 0.51, and the specific surface area was 0.85 $m^2/g$. From SEM observation it was confirmed that the cathode active material was spherical, had mostly a uniform particle size and were particles having a dense solid structure. Furthermore, it was confirmed that the crystal structure of this cathode active material was single-phase hexagonal layered crystalline lithium nickel manganese composite oxide, and that the composition of the cathode active material was represented as $Li_{1.15}Ni_{0.331}Co_{0.331}Mn_{0.332}Zr_{0.005}O_2$, where Li was 7.93% by weight, Ni was 19.2% by weight, Co was 19.3% by weight, Mn was 18.0% by weight and Zr was 0.45% by weight.

Evaluation of a battery that was the same as that of Example 3 was performed, and it was found that the initial discharge capacity was 155.6 mAh/g, and the cathode resistance was 5.1Ω. Moreover, the capacity retention rate after 200 cycles was 90%. The particles had a solid structure, so when compared with the particles in example 3 having the same composition, the specific surface area was low and the cathode resistance was high.

Comparative Example 3

Except for the temperature inside the tank being 40° C., the pH during particle growth being 11.6, and the calcination conditions being 1050° C. and 10 hours, the composite oxide cathode active material was obtained in the same way as in Example 3.

The composition of the composite hydroxide particles is expressed as $Ni_{0.332}Co_{0.331}Mn_{0.332}Zr_{0.005}(OH)_{2+a}$ (0≤a≤0.5), the average particle size was 4.0 μm, and the value [(d90−d10)/average particle size] was 0.44. From SEM observation, it was confirmed that the composite hydroxide particles were spherical and mostly had uniform particle size. Furthermore, it was observed that the composite hydroxide particles comprised secondary particles, and that the secondary particles were spherical with a center section having primary particles with a particle size of 0.05 μm and an outer shell section having plate shape or needle shaped primary particles with a particle size of 0.9 μm; the thickness of the outer shell section being 1.0 μm and the ratio of the thickness of the outer shell section with respect to the particle size being 25%.

The average particle size of the cathode active material was 8.9 μm, the value [(d90−d10)/average particle size] was 0.92, and the specific surface area was 0.42 $m^2/g$. From SEM observation it was confirmed that the cathode active material was spherical, however, sintering of secondary particles advanced forming tertiary particles. It was also confirmed from this observation that sintering of primary particles and particle growth advanced, and the hollow section became very small. From this observation it was found that the thickness of the outer shell section of the cathode active material was 2.0 μm and the ratio of the thickness of the outer shell section with respect to the particle size was 22.5%. Furthermore, it was confirmed that the crystal structure of this cathode active material was single-phase hexagonal layered crystalline lithium nickel manganese composite oxide, and that the composition of the cathode active material was represented as $Li_{1.146}Ni_{0.332}CO_{0.331}Mn_{0.332}Zr_{0.005}O_2$, where Li was 7.80% by weight, Ni was 19.1% by weight, Co was 19.1% by weight, Mn was 17.9% by weight, and Zr was 0.45% by weight.

When evaluating a battery in the same way as for Example 3, it was found that the initial discharge capacity was 141.4 mAh/g, and the cathode resistance was 8.6Ω. Moreover, the capacity retention rate after 200 cycles was 76%. The calcination temperature was high and sintering advanced, so when compared with the third example having the same composition, the specific surface area was low and the cathode resistance value was high.

TABLE 1

(Manufacturing Conditions and Characteristics of Composite Hydroxide Particles)

| | | | | | Secondary Particles | Average Particle Size of Primary Particles | | Thickness of the Outer Shell Section | |
|---|---|---|---|---|---|---|---|---|---|---|
| | Added Element M | Tank Temp. (°C.) | Particle Nucleation pH | Growth pH | NH$_3$ Concentration (g/L) | Average particle Size (μm) | (d90 − d10)/ Avg. Particle Size | Center section (μm) | Outer shell section (μm) | Thickness (μm) | Rate (%) |
| Example 1 | — | 70 | 13.1 | 10.6 | — | 3.9 | 0.49 | 0.05 | 0.8 | 1.2 | 30.8 |
| Example 2 | — | 70 | 13.1 | 10.6 | — | 3.9 | 0.49 | 0.05 | 0.8 | 1.2 | 30.8 |
| Example 3 | Zr | 65 | 12.8 | 10.6 | — | 3.8 | 0.41 | 0.04 | 0.9 | 0.95 | 25.0 |
| Example 4 | Zr, W | 65 | 12.8 | 10.6 | — | 4.0 | 0.44 | 0.03 | 0.8 | 1.0 | 25.0 |
| Example 5 | Zr, W | 70 | 13.1 | 10.6 | — | 3.8 | 0.42 | 0.03 | 0.8 | 1.0 | 26.3 |
| Example 6 | — | 70 | 13.1 | 10.6 | — | 4.1 | 0.50 | 0.04 | 0.9 | 1.1 | 26.8 |
| Example 7 | — | 70 | 13.1 | 10.6 | — | 3.9 | 0.48 | 0.05 | 0.9 | 1.3 | 33.3 |
| Comparative Example 1 | — | 40 | 11.0 | 11.0 | 10 | 10.2 | 0.70 | — | — | Uniform structure | |
| Comparative Example 2 | — | 40 | 12.8 | 11.6 | 15 | 4.2 | 0.43 | — | — | Uniform structure | |
| Comparative Example 3 | Zr | 40 | 12.8 | 11.6 | — | 4.0 | 0.44 | 0.05 | 0.9 | 1.0 | 25 |

TABLE 2

(Manufacturing Conditions and Characteristics of Cathode Active Material)

| | Li/Me | Calcination (°C.) | Composition | Avg. Particle Size (μm) | (d90 − d10)/ Avg. particle size | Outer shell thickness | | Specific Surface Area (m$^2$g$^{-1}$) | Initial Discharge Capacity (mAh·g$^{-1}$) | Cathode Resistance (Ω) | Capacity Retention Rate (%) |
|---|---|---|---|---|---|---|---|---|---|---|---|
| | | | | | | Thickness (μm) | Rate (%) | | | | |
| Example 1 | 1.35 | 900 | Li$_{1.36}$Ni$_{0.50}$Mn$_{0.50}$O$_2$ | 4.3 | 0.55 | 0.66 | 15.3 | 1.5 | 206.5 | 8.3 | 86 |
| Example 2 | 1.25 | 850 | Li$_{1.25}$Ni$_{0.50}$Mn$_{0.50}$O$_2$ | 4.8 | 0.52 | 0.58 | 14.1 | 1.6 | 202.3 | 8.9 | 85 |
| Example 3 | 1.15 | 950 | Li$_{1.15}$Ni$_{0.332}$Co$_{0.331}$Mn$_{0.332}$Zr$_{0.005}$O$_2$ | 4.0 | 0.47 | 0.92 | 23 | 1.3 | 158.2 | 3.2 | 91 |
| Example 4 | 1.15 | 950 | Li$_{1.15}$Ni$_{0.33}$Co$_{0.33}$Mn$_{0.33}$Zr$_{0.005}$W$_{0.005}$O$_2$ | 4.3 | 0.49 | 0.95 | 22 | 1.4 | 157.4 | 3.1 | 92 |
| Example 5 | 1.15 | 950 | Li$_{1.15}$Ni$_{0.33}$Co$_{0.33}$Mn$_{0.33}$Zr$_{0.005}$W$_{0.005}$O$_2$ | 4.1 | 0.48 | 0.94 | 23 | 1.3 | 158.2 | 3.2 | 92 |
| Example 6 | 1.35 | 900 | Li$_{1.36}$Ni$_{0.50}$Mn$_{0.50}$O$_2$ | 4.3 | 0.53 | 1.1 | 25.6 | 1.2 | 203.3 | 8.6 | 85 |
| Example 7 | 1.35 | 900 | Li$_{1.36}$Ni$_{0.50}$Mn$_{0.50}$O$_2$ | 4.3 | 0.54 | 0.7 | 16 | 1.4 | 204.5 | 8.4 | 85 |
| Comparative Example 1 | 1.35 | 900 | Li$_{1.36}$Ni$_{0.50}$Mn$_{0.50}$O$_2$ | 10.5 | 0.73 | Solid | | 1.4 | 208.2 | 30.5 | 78 |
| Comparative Example 2 | 1.15 | 950 | Li$_{1.15}$Ni$_{0.332}$Co$_{0.331}$Mn$_{0.332}$Zr$_{0.005}$O$_2$ | 4.4 | 0.51 | Solid | | 0.85 | 155.6 | 5.1 | 90 |
| Comparative Example 3 | 1.15 | 1050 | Li$_{1.146}$Ni$_{0.332}$Co$_{0.331}$Mn$_{0.332}$Zr$_{0.005}$O$_2$ | 8.9 | 0.92 | 1.0 | 22.5 | 0.42 | 141.4 | 8.6 | 76 |

INDUSTRIAL APPLICABILITY

The non-aqueous electrolyte secondary battery of the present invention is suitable as a power source for compact electronic devices (notebook type personal computer, mobile telephone, and the like).

Moreover, the non-aqueous electrolyte secondary battery of the present invention has excellent safety characteristics, is compact and has high output, so is suitable for use as a power source of conveying equipment with limited space.

EXPLANATION OF REFERENCE NUMBERS

1 Coin type battery
2 Case
2a Cathode can
2b Anode can
2c Gasket
3 Electrodes
3a Cathode
3b Anode
3c Separator

What is claimed is:

1. A method for manufacturing nickel manganese composite hydroxide particles by a crystallization reaction such that the nickel manganese composite hydroxide particles can be expressed by a general formula Ni$_x$Mn$_y$Co$_z$M$_t$(OH)$_{2+a}$ wherein x+y+z+t=1, 0.3≤x≤0.7, 0.1≤y≤0.55, 0≤z≤0.4, 0≤t≤0.1, 0≤a≤0.5, and M is one or more added element that is selected from among Mg, Ca, Al, Ti, V, Cr, Zr, Nb, Mo and W, the manufacturing method comprising:

a nucleation step of controlling an aqueous solution for nucleation, which includes at least a metallic compound that contains nickel and a metallic compound that contains manganese, and does not include a complex ion formation agent that forms complex ions with nickel, manganese and cobalt, so that the temperature of the solution is 60° C. or greater, and so that the pH value that is measured at a standard solution temperature of 25° C. is 11.5 to 13.5, and generating nuclei as center sections comprising fine primary particles; and a particle growth step of controlling an aqueous solution for particle growth, which includes the nuclei that were formed in the nucleation step and does not substantially include a complex ion formation agent that forms complex ions with nickel, manganese and cobalt, so that the temperature of the solution is 60° C. or greater, and so that the pH value that is measured at a standard solution temperature of 25° C. is 9.5 to 11.5, and is less than the pH value in the nucleation step, and growing an outer shell section comprising primary particles having a plate shape or needle shape that is larger than the fine primary particles on an outer surface of the nuclei.

2. The manufacturing method for manufacturing nickel manganese composite hydroxide particles according claim 1, wherein
in the nucleation step and particle growth step, an oxygen concentration inside the reaction tank is controlled to be 10% by volume or less.

3. The manufacturing method for manufacturing nickel manganese composite hydroxide particles according to claim 1, wherein
the pH value of the aqueous solution for nucleation after the nucleation step has finished is adjusted and the resulting aqueous solution is used as the aqueous solution for particle growth.

4. The manufacturing method for manufacturing nickel manganese composite hydroxide particles according to claim 1, wherein
a solution that is obtained by adding an aqueous solution, which contains the nuclei formed in the nucleation step, to a component adjustment aqueous solution, which is separate from the aqueous solution for nucleation in which the nuclei were formed, does not substantially include a complex ion formation agent that forms complex ions with nickel, manganese and cobalt, and is controlled so that the solution temperature is 60° C. or greater, and so that the pH value that is measured at a standard solution temperature of 25° C. is 9.5 to 11.5 and is lower than the pH value in the nucleation step, is used as the aqueous solution for particle growth.

5. The manufacturing method for manufacturing nickel manganese composite hydroxide particles according to claim 4, wherein
the particle growth step starts after part of the liquid component of the aqueous solution for particle growth has been removed.

6. The manufacturing method for manufacturing nickel manganese composite hydroxide particles according to claim 1, wherein
the nickel composite hydroxide that was obtained in the particle growth step is covered with a compound containing the one or more added elements.

7. Nickel manganese composite hydroxide particles that are expressed by a general formula $Ni_xMn_yCo_zM_t(OH)_{2+a}$ wherein x+y+z+t=1, $0.3 \leq x \leq 0.7$, $0.1 \leq y \leq 0.55$, $0 \leq z \leq 0.4$, $0 \leq t \leq 0.1$, $0 \leq a \leq 0.5$, and M is one or more added element that is selected from among Mg, Ca, Al, Ti, V, Cr, Zr, Nb, Mo and W, and that are spherical shaped secondary particles that are formed by a plurality of aggregate primary particles, wherein the secondary particles have an average particle size of 3 to 7 µm, a value of (d90−d10)/average particle size, which is an index indicating the extent of the particle size distribution, of 0.55 or less, the particles having a center section comprising fine primary particles, and an outer shell section on the outside of the center section comprising plate shaped or needle shaped primary particles that are larger than the fine primary particles, with the thickness of the outer shell section being 0.3 to 3 µm.

8. The nickel manganese composite hydroxide particles according to claim 7, wherein
the fine primary particles have an average particle size of 0.01 to 0.3 µm, and
the plate shaped or needle shaped primary particles that are larger than the fine primary particles have an average particle size of 0.3 to 3 µm.

9. The nickel manganese composite hydroxide particles according to claim 7, wherein
the ratio of the thickness of the outer shell section with respect to the particle size of the secondary particles is 10 to 45%.

10. The nickel manganese composite hydroxide particles according to claim 7, wherein
the one or more added elements are uniformly distributed inside the secondary particles and/or uniformly cover the surface of the secondary particles.

* * * * *